(12) United States Patent
Ehrlichmann et al.

(10) Patent No.: US 11,813,818 B2
(45) Date of Patent: Nov. 14, 2023

(54) FIBER-REINFORCED COMPOSITE EXTRUSION WITH ENHANCED PROPERTIES

(71) Applicant: Andersen Corporation, Bayport, MN (US)

(72) Inventors: Jessica Kathryn Ehrlichmann, Ramsey, MN (US); Trevor Dean Peterson, Stillwater, MN (US); Patrick Jerome Gronlund, Somerset, WI (US)

(73) Assignee: Andersen Corporation, Bayport, MN (US)

( * ) Notice: Subject to any disclaimer, the term of this patent is extended or adjusted under 35 U.S.C. 154(b) by 524 days.

(21) Appl. No.: 15/439,603

(22) Filed: Feb. 22, 2017

(65) Prior Publication Data

US 2017/0240738 A1  Aug. 24, 2017

Related U.S. Application Data

(60) Provisional application No. 62/298,658, filed on Feb. 23, 2016.

(51) Int. Cl.
*B32B 1/00* (2006.01)
*C08L 27/06* (2006.01)
(Continued)

(52) U.S. Cl.
CPC .............. *B32B 1/00* (2013.01); *B29B 7/90* (2013.01); *B29B 7/92* (2013.01); *B29B 9/06* (2013.01);
(Continued)

(58) Field of Classification Search
CPC .. C08L 27/06; C08L 2207/53; C08L 2205/03; E06B 3/30; E06B 3/22;
(Continued)

(56) References Cited

U.S. PATENT DOCUMENTS 3,328,501 A  6/1967  Barnett
3,931,094 A  1/1976  Segal et al.
(Continued)

FOREIGN PATENT DOCUMENTS

CN  1948665  4/2007
CN  102702649  10/2012
(Continued)

OTHER PUBLICATIONS

"International Preliminary Report on Patentability," for PCT Application No. PCT/US2017/019072 dated Sep. 7, 2018 (10 pages).
(Continued)

*Primary Examiner* — James C Yager
(74) *Attorney, Agent, or Firm* — Pauly, DeVries Smith & Deffner LLC

(57) ABSTRACT

Embodiments herein include compositions, extruded articles, and methods of making the same. In an embodiment, an extruded article is included. The extruded article can include an extruded segment comprising a first composition. The first composition can include a polymer resin, an impact modifier and fibers. In some embodiments, the extruded segment can have a surface exhibiting an average depression depth of less than 0.0045 inches (0.1143 mm). Other embodiments are also included herein.

16 Claims, 15 Drawing Sheets

(51) Int. Cl.
| | |
|---|---|
| *C08K 7/14* | (2006.01) |
| *B32B 27/08* | (2006.01) |
| *B32B 27/20* | (2006.01) |
| *B32B 27/30* | (2006.01) |
| *B32B 3/06* | (2006.01) |
| *B29B 7/90* | (2006.01) |
| *B29B 9/06* | (2006.01) |
| *B29B 7/92* | (2006.01) |
| *E06B 3/22* | (2006.01) |
| *E06B 3/30* | (2006.01) |
| *B29C 48/18* | (2019.01) |
| *B29C 48/92* | (2019.01) |
| *B29C 48/03* | (2019.01) |
| *B29C 48/04* | (2019.01) |
| *B29C 48/00* | (2019.01) |
| *B29K 105/12* | (2006.01) |
| *B29B 7/38* | (2006.01) |
| *B29L 31/00* | (2006.01) |
| *B29B 7/86* | (2006.01) |
| *B29B 7/84* | (2006.01) |
| *B29L 9/00* | (2006.01) |

(52) U.S. Cl.
CPC ............ *B29C 48/022* (2019.02); *B29C 48/03* (2019.02); *B29C 48/04* (2019.02); *B29C 48/18* (2019.02); *B29C 48/92* (2019.02); *B32B 3/06* (2013.01); *B32B 27/08* (2013.01); *B32B 27/20* (2013.01); *B32B 27/304* (2013.01); *C08K 7/14* (2013.01); *C08L 27/06* (2013.01); *E06B 3/22* (2013.01); *E06B 3/30* (2013.01); *B29B 7/38* (2013.01); *B29B 7/845* (2013.01); *B29B 7/86* (2013.01); *B29K 2105/12* (2013.01); *B29K 2995/0089* (2013.01); *B29L 2009/00* (2013.01); *B29L 2031/005* (2013.01); *B32B 2262/101* (2013.01); *B32B 2419/00* (2013.01); *C08L 2205/03* (2013.01); *C08L 2207/53* (2013.01); *E06B 3/221* (2013.01)

(58) Field of Classification Search
CPC .. E06B 3/221; B29B 9/06; B29B 7/90; B29B 7/92; B29B 7/38; B29B 7/845; B29B 7/86; B29C 47/92; B29C 47/0011; B29C 47/0009; B29C 47/06; B29C 47/0004; B32B 1/00; B32B 27/20; B32B 3/06; B32B 27/08; B32B 27/304; B32B 2419/00; B32B 2262/101; C08K 7/14; B29K 2105/12; B29K 2995/0089; B29L 2009/00; B29L 2031/005
USPC ....... 428/220, 480, 36.9, 36.91, 35.7, 36.92, 428/402, 523, 195.1, 412, 474.4, 336, 428/339, 401, 411.1, 421, 446, 500, 428/537.5, 99, 116, 212, 337, 354, 375, 428/413, 454, 481, 516, 521, 537.1, 114, 428/141, 161, 192, 201, 211.1, 213, 217, 428/298.1, 299.1, 304.4, 323, 325, 36.5, 428/407, 422, 423.1, 457, 458, 474.7, 428/522, 532, 534, 535, 76, 113, 156, 428/159, 164, 165, 167, 168, 172, 174, 428/188, 200, 203, 206, 207, 209, 216, 428/221, 222, 293.4, 297.4, 297.7, 299.4, 428/299.7, 300.4, 300.7, 301.4, 316.6, 428/317.5, 318.4, 320.2, 331, 332, 335, 428/338, 343, 349, 34.1, 34.5, 355 R, 428/359, 35.5, 368, 36.4, 379, 380, 389, 428/391, 394, 403, 406, 414, 416, 419, 428/424.6, 426, 430, 438, 441, 442, 428/473.5, 474.9, 475.2, 476.3, 476.9, 428/483, 489, 492, 507, 512, 519, 53, 57, 428/58, 67, 68, 702, 71; 264/328.1, 523, 264/176.1, 319, 41, 241, 171.1, 299, 40.1, 264/164, 255, 494, 540, 257, 500, 165, 264/209.1, 239, 279, 310, 322, 328.14, 264/328.16, 328.17, 328.18, 331.18, 264/331.19, 400, 478, 492, 572, 101, 103, 264/12, 136, 140, 141, 146, 15, 171.11, 264/171.13, 171.26, 171.28, 172.11, 264/172.19, 173.17, 175, 177.1, 177.17, 264/177.2, 1.1, 1.36, 209.2, 209.3, 209.6, 264/209.7, 210.2, 210.8, 211, 211.1, 264/211.12, 259, 263, 292, 293, 294, 308, 264/320, 323, 328.9, 345, 349, 406, 407, 264/40.4, 456, 45.4, 46.6, 477, 488, 5, 264/503, 504, 51, 514, 515, 54, 555, 75
See application file for complete search history.

(56) References Cited

U.S. PATENT DOCUMENTS

| | | |
|---|---|---|
| 3,996,082 A | 12/1976 | Leatherman |
| 4,183,777 A * | 1/1980 | Summers ................ B32B 27/08 156/243 |
| 4,514,449 A | 4/1985 | Budich et al. |
| 4,627,472 A | 12/1986 | Goettler et al. |
| 4,720,951 A | 1/1988 | Thorn et al. |
| 4,958,469 A | 9/1990 | Plummer |
| 5,145,892 A | 9/1992 | Yasukawa et al. |
| 5,156,907 A | 10/1992 | Layden et al. |
| 5,205,102 A | 4/1993 | Plummer |
| 5,264,261 A | 11/1993 | Bush |
| 5,273,819 A | 12/1993 | Jex |
| 5,406,768 A | 4/1995 | Giuseppe et al. |
| 5,441,801 A | 8/1995 | Deaner et al. |
| 5,486,553 A | 1/1996 | Deaner et al. |
| 5,497,594 A | 3/1996 | Giuseppe et al. |
| 5,508,072 A | 4/1996 | Hodson et al. |
| 5,518,677 A | 5/1996 | Deaner et al. |
| 5,539,027 A | 7/1996 | Deaner et al. |
| 5,612,413 A * | 3/1997 | Rozkuszka ............. C08L 27/06 525/902 |
| 5,661,939 A | 9/1997 | Coulis et al. |
| 5,695,874 A | 12/1997 | Deaner et al. |
| 5,705,571 A | 1/1998 | Tsiang et al. |
| 5,707,571 A | 1/1998 | Reedy |
| 5,773,138 A | 6/1998 | Seethamraju et al. |
| 5,827,607 A | 10/1998 | Deaner et al. |
| D402,770 S | 12/1998 | Hendrickson et al. |
| 5,874,146 A | 2/1999 | Kagan et al. |
| 5,882,564 A | 3/1999 | Puppin |
| 5,902,657 A | 5/1999 | Hanson et al. |
| 5,932,334 A | 8/1999 | Deaner et al. |
| 5,948,524 A | 9/1999 | Seethamraju et al. |
| 5,981,067 A | 11/1999 | Seethamraju et al. |
| 5,985,429 A | 11/1999 | Plummer et al. |
| 6,004,668 A | 12/1999 | Deaner et al. |
| 6,015,611 A | 1/2000 | Deaner et al. |
| 6,015,612 A | 1/2000 | Deaner et al. |
| 6,054,207 A | 4/2000 | Finley |
| 6,122,877 A * | 9/2000 | Hendrickson ....... E04F 13/0864 52/233 |
| 6,140,455 A | 10/2000 | Nagashima et al. |
| 6,197,412 B1 | 3/2001 | Jambois |
| 6,210,792 B1 | 4/2001 | Seethamraju et al. |
| 6,265,037 B1 | 7/2001 | Godavarti et al. |
| 6,280,667 B1 | 8/2001 | Koenig et al. |
| 6,342,172 B1 | 1/2002 | Finley |
| 6,346,160 B1 | 2/2002 | Puppin |
| 6,357,197 B1 | 3/2002 | Serino et al. |
| 6,365,081 B1 | 4/2002 | Beck |
| 6,875,385 B2 | 4/2005 | Hawley et al. |
| 6,899,782 B1 | 5/2005 | Chang et al. |

(56) References Cited

U.S. PATENT DOCUMENTS

| | | | |
|---|---|---|---|
| 7,041,716 | B2 | 5/2006 | Ton-That et al. |
| 7,173,082 | B2* | 2/2007 | Ahn ................. C08F 285/00 523/201 |
| 7,691,305 | B2 | 4/2010 | Sutton et al. |
| 7,858,008 | B2 | 12/2010 | Lee et al. |
| 8,211,341 | B2 | 7/2012 | Lustiger |
| 8,586,662 | B2 | 11/2013 | Harder et al. |
| 8,784,719 | B2 | 7/2014 | Lingannaiah et al. |
| 8,829,097 | B2 | 9/2014 | Deaner et al. |
| 8,852,488 | B2 | 10/2014 | Sain et al. |
| 8,940,132 | B2 | 1/2015 | Sain et al. |
| 9,221,974 | B2 | 12/2015 | Rexin et al. |
| 10,550,257 | B2 | 2/2020 | Peterson et al. |
| 11,267,963 | B2 | 3/2022 | Peterson et al. |
| 11,680,439 | B2 | 6/2023 | Gronlund |
| 2002/0106498 | A1 | 8/2002 | Deaner et al. |
| 2006/0065993 | A1 | 3/2006 | Stucky et al. |
| 2006/0175325 | A1 | 8/2006 | Day et al. |
| 2007/0141316 | A1 | 6/2007 | Mcgrath et al. |
| 2008/0021135 | A1* | 1/2008 | Garft ................ C08L 27/06 524/13 |
| 2009/0181207 | A1 | 7/2009 | Michalik et al. |
| 2009/0246544 | A1 | 10/2009 | Narita et al. |
| 2012/0220697 | A2 | 8/2012 | Deaner et al. |
| 2013/0217815 | A1 | 8/2013 | Deaner et al. |
| 2017/0240737 | A1 | 8/2017 | Peterson et al. |
| 2019/0071918 | A1 | 3/2019 | Gronlund et al. |
| 2020/0131355 | A1 | 4/2020 | Peterson et al. |
| 2022/0162437 | A1 | 5/2022 | Peterson et al. |

FOREIGN PATENT DOCUMENTS

| | | |
|---|---|---|
| EP | 0458520 | 11/1997 |
| EP | 0902148 | 3/1999 |
| EP | 1589076 | 10/2005 |
| EP | 1842657 | 10/2007 |
| EP | 2031169 | 3/2009 |
| EP | 2384879 | 11/2011 |
| JP | 2008273217 | 11/2008 |
| JP | 2012200894 | 10/2012 |
| WO | 2004083541 | 9/2004 |
| WO | 2005090469 | 9/2005 |
| WO | 2009098280 | 8/2009 |
| WO | 2010008199 | 1/2010 |
| WO | 2012105915 | 8/2012 |
| WO | 2015120429 | 8/2015 |
| WO | 2017147259 | 8/2017 |
| WO | 2017147268 | 8/2017 |

OTHER PUBLICATIONS

"International Preliminary Report on Patentability," for PCT Application No. PCT/US2017/019085 dated Sep. 7, 2018 (10 pages).
"International Search Report and Written Opinion," for PCT Application No. PCT/US2017/019072 dated May 15, 2017 (32 pages).
"International Search Report and Written Opinion," for PCT Application No. PCT/US2017/019085 dated May 31, 2017 (14 pages).
"Non-Final Office Action," for U.S. Appl. No. 15/439,586 dated Jul. 12, 2018 (17 pages).
"International Search Report and Written Opinion," for PCT Application No. PCT/US2018/046886 dated Jan. 7, 2019 (11 pages).
"Response to Non Final Office Action," for U.S. Appl. No. 15/439,586 filed with the USPTO Jan. 11, 2019 (12 pages).
"Non-Final Office Action," for U.S. Appl. No. 15/439,586 dated May 1, 2019 (12 pages).
"Notice of Allowance," for U.S. Appl. No. 15/439,586 dated Sep. 19, 2019 (12 pages).
"Response to Communication Pursuant to Rules 161 (1) and 162 EPC," for European Patent Application No. 17709855.5 filed Apr. 10, 2019 (19 pages).
"Response to Communication Pursuant to Rules 161 (1) and 162 EPC," for European Patent Application No. 17711037.6 filed Apr. 10, 2019 (15 pages).
"Response to Non-Final Office Action," for U.S. Appl. No. 15/439,586 filed with the USPTO Jun. 14, 2019 (8 pages).
Clemons, Craig M. "Wood Flour," Functional Fillers for Plastics, 2010, p. 269-283 (24 pages).
"International Preliminary Report on Patentability," for PCT Application No. PCT/US2018/046886 dated Feb. 27, 2020 (8 pages).
"Non-Final Office Action," for U.S. Appl. No. 16/104,029 dated Aug. 12, 2020 (32 pages).
"Non-Final Office Action," for U.S. Appl. No. 16/730,110 dated Sep. 24, 2020 (11 pages).
"Communication Pursuant to Article 94(3) EPC," for European Patent Application No. 17709855.5 dated May 25, 2021 (5 pages).
"Communication Pursuant to Article 94(3) EPC," for European Patent Application No. 17711037.6 dated May 17, 2021 (4 pages).
"Final Office Action," for U.S. Appl. No. 16/104,029 dated Apr. 29, 2021 (25 pages).
"Non-Final Office Action," for U.S. Appl. No. 16/730,110 dated Apr. 26, 2021 (23 pages).
"Notice of Allowance," for U.S. Appl. No. 16/730,110 dated Oct. 27, 2021 (11 pages).
"Response to Communication Pursuant to Article 94(3) EPC," for European Patent Application No. 17709855.5 filed Nov. 24, 2021 (11 pages).
"Response to Communication Pursuant to Article 94(3) EPC," for European Patent Application No. 17711037.6 filed Nov. 23, 2021 (9 pages).
"Response to Communication Pursuant to Rules 161(1) and 162 EPC," for European Patent Application No. 18789513.1 filed Oct. 9, 2020 (15 pages).
"Response to Final Office Action," for U.S. Appl. No. 16/104,029 filed with the USPTO Oct. 28, 2021 (11 pages).
"Response to Non-Final Office Action," for U.S. Appl. No. 16/104,029, filed Nov. 12, 2020 (11 pages).
"Response to Non-Final Office Action," for U.S. Appl. No. 16/730,110, filed Jan. 25, 2021 (8 pages).
"Response to Non-Final Office Action," for U.S. Appl. No. 16/730,110, filed Jul. 26, 2021 (8 pages).
"Non-Final Office Action," for U.S. Appl. No. 16/104,029 dated Mar. 25, 2022 (17 pages).
"Response to Non-Final Office Action," for U.S. Appl. No. 16/104,029, filed Jul. 25, 2022 (9 pages).
Giles, Harold, et al. "Extrusion: the Definitive Processing Guide and Handbook," William Andrew Inc., 2005, pp. 166, 375-376, and 386-388 (9 pages).
"Biostrength 150 Technical Datasheet," Published by Arkema and archived online on Jun. 7, 2016 at https://web.archive.org/web/20160607205030/https://www.palmerholland.com/Assets/User/Documents/Product/45833/5890/MITM10308.PDF (Year: 2016), 2 pages.
"Communication Pursuant to Article 94(3) EPC," for European Patent Application No. 17709855.5 dated Feb. 22, 2023 (5 pages).
"Communication Pursuant to Article 94(3) EPC," for European Patent Application No. 17711037.6 dated Dec. 23, 2022 (4 pages).
"Final Office Action," for U.S. Appl. No. 16/104,029 dated Oct. 19, 2022 (14 pages).
"Non-Final Office Action," for U.S. Appl. No. 17/668,871 dated Nov. 17, 2022 (20 pages).
"Notice of Allowance," For U.S. Appl. No. 16/104,029 dated Feb. 6, 2023 (10 pages).
"Office Action," for Canadian Patent Application No. 3015339 dated Mar. 10, 2023 (7 pages).
"Office Action," for Canadian Patent Application No. 3015362 dated Mar. 9, 2023 (6 pages).
"Response to Communication Pursuant to Article 94(3) EPC," for European Patent Application No. 17711037.6 filed May 2, 2023 (8 pages).
"Response to Final Office Action," for U.S. Appl. No. 16/104,029, filed Jan. 19, 2023 (8 pages).
"Response to Non-Final Office Action," for U.S. Appl. No. 17/668,871, filed Feb. 16, 2023 (6 pages).
"DuPont Elvaloy Polymer Modifier for Rigid PVC Compounds Product Brochure," http://www.dupont.com/content/dam/dupont/products-and-services/packaging-materials-and-solutions/packaging-

(56) References Cited

OTHER PUBLICATIONS materials-and-solutions-landing/documents/Elvaloy_RigidPVC_Brochure.pdf, Oct. 2009 (4 pages).
"Non-Final Office Action," for U.S. Appl. No. 17/668,871 dated Sep. 19, 2023 (12 pages).

\* cited by examiner

FIBER-REINFORCED COMPOSITE EXTRUSION WITH ENHANCED PROPERTIES

This application claims the benefit of U.S. Provisional Application No. 62/298,658, filed Feb. 23, 2016, the content of which is herein incorporated by reference in its entirety.

FIELD

Embodiments herein relate to composite extrusions. More specifically, embodiments herein relate to fiber-reinforced composite extrusions with enhanced properties.

BACKGROUND

Conventional window and door manufacturers have commonly used wood and metal components in forming structural members. Commonly, residential windows are manufactured from milled wood products or extruded aluminum or polymeric parts that are assembled with glass to form typically double hung or casement units. Wood windows, while structurally sound, useful and well adapted for use in many residential installations, can deteriorate under certain circumstances. Wood windows also require painting and other periodic maintenance. Wood windows also suffer from cost problems related to the availability of suitable wood for construction. Clear wood products are slowly becoming scarcer and more expensive as demand increases. Metal components are often combined with glass and formed into single unit sliding windows. Metal windows can suffer from substantial energy loss during winter months.

Extruded thermoplastic materials have also been used as components in window and door manufacture. Filled and unfilled thermoplastics have been extruded into useful seals, trim, weather stripping, coatings and other window construction components. Thermoplastic materials such as polyvinyl chloride have been combined with wood particles in manufacturing window components. Pultrusions with various materials have also been used as components in window and door manufacture. However, such composites still have various drawbacks including less than desirable properties and physical characteristics.

SUMMARY

Embodiments herein include compositions, extruded articles, and methods of making the same. In an embodiment, an extruded article is included. The extruded article can include an extruded segment comprising a first composition. The first composition can include a polymer resin, an impact modifier and fibers. The extruded segment can have a surface. The surface can exhibit an average depression depth of less than 0.0045 inches (0.1143 mm).

In an embodiment, an extruded article is included. The article can include an extruded segment comprising a first composition. The first composition can include a polymer resin, an impact modifier in an amount greater than or equal to 5 phr, and fibers.

In an embodiment, a method of making an extruded article is included. The method can include compounding materials comprising a polymer resin, an impact modifier, and fibers into pellets. The method can further include extruding the pellets to form an extrusion layer of an extruded article. The extrusion layer having a surface exhibiting an average depression depth of less than 0.0045 inches (0.1143 mm).

In an embodiment, a method of making an extruded article is included. The method can include extruding a first composition to form the extruded article. The extruded article can include a surface exhibiting an average depression depth of less than 0.0045 inches (0.1143 mm). The first composition can include a polymer resin, an impact modifier and fibers.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
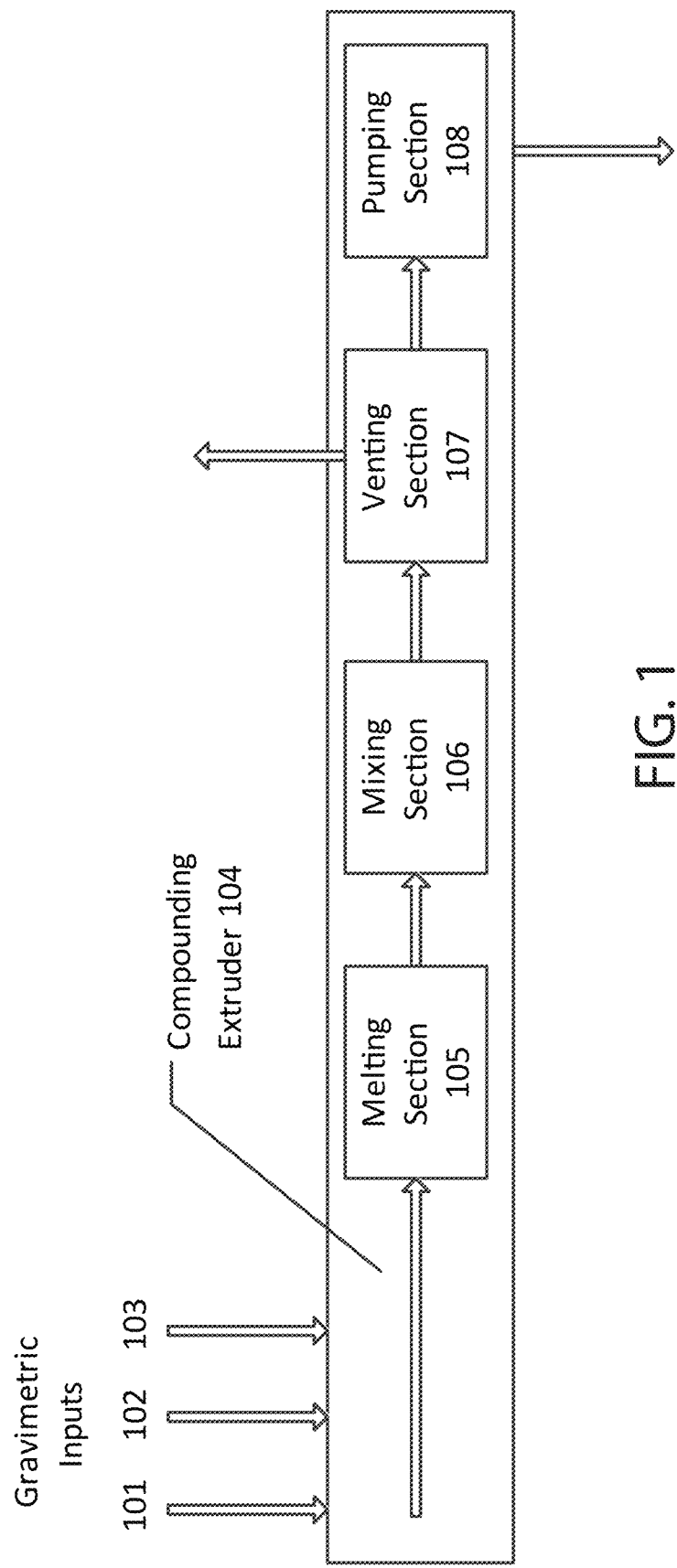
FIG. 1 is a schematic diagram of an exemplary compounding extruder system.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As used herein, the term "compounding" refers to the process of combining a polymeric material with at least one other ingredient, either polymeric or non-polymeric, at a temperature sufficiently elevated to allow the ingredients to be mixed into a molten mass.

As used herein, the term "surface depressions" shall refer to points where the surface height deviates from the nominal height of the surface such as in the case of surface depressions or pits.

As used herein, the term "resin" shall refer to the thermoplastic polymer content of the extruded or pultruded composition. The resin portion of the composition excludes any polymer content provided by processing aids.

As used herein, the term "process aid" or "processing aid" refers to additives for improving the processing of the compositions herein containing polymer resin. Such additives may include metal release agents, lubricants, viscosity modifiers, additives for improving melt strength in extrusion, as well as other additives. Process aids can function in a variety of ways, sometimes modifying the polymer, and sometimes depositing onto various surfaces that the polymer contacts during processing, or both. In some cases, process aids may function in more than one way, for example as a lubricant and as a metal release agent.

As described above, thermoplastic materials such as polyvinyl chloride have been combined with wood particles in manufacturing window components. However, such compositions have had various drawbacks. In some cases, the resulting composites have lacked a desirable level of impact resistance. Impact resistance can be important in some applications for the finished product to resist damage from impacts.

Also, in some cases, the resulting composites have included substantial surface depressions, such as pits or depressions hindering finishing steps. It is believed that some surface depressions can result as the composite passes through an extrusion die and can be influenced by filler aspect ratio or fill content, as well as process variation in extruding or pultruding. Such surface depressions can result in significant scrap, aesthetic deficiencies, or costly labor, materials and processes to diminish those surface depressions.

Embodiments herein can also include various coatings disposed on extrusions. Typical coatings for extrusions can include paint or co-extrusion of capstock (polyvinylchloride, acrylic, polylactic acid, or polypropylene). Coatings can be applied to substrates for aesthetic reasons as well as protective barriers to prevent excessive moisture or UV radiation from reaching the substrate and promoting degradation. However, in some cases surface depressions can actually become more pronounced after co-extrusion due to the inability of coatings to fill and mask these depressions by conventional co-extrusion materials or by amplification through dark color, gloss and/or high gloss application.

However, it is disclosed herein that combinations of components in the compositions can be used to form extrudates that can address some of the deficiencies noted above. By way of example, it has been found that compositions including a polymer resin, fibers, and an impact modifier can result in extrudates that exhibit reduced depth of surface depressions.

In addition, surprising aspects regarding desirable amounts of impact modifiers have been discovered. Standard guidance for the use of impact modifiers provides that amounts greater than 5 phr do not provide benefits. Indeed, the use of amounts greater than 5 phr, in some compositions, can actually be detrimental to mechanical properties as well as being economically inefficient. However, it has been discovered that the use of high levels of impact modifiers, in various unique compositions herein, can have benefits at levels far above what is normally considered to be the maximum amount.

As such, embodiments herein can include extrudates that include one or more layers of compositions that can result in reduced depth of surface depressions and/or improved impact and strength performance depending on the identified application.

Fibers

Descriptions herein of exemplary fibers are only applicable for the description of embodiments herein and not for other patents or patent applications of the applicant and/or inventors unless explicitly stated to the contrary. Various embodiments herein can include a fiber component. The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites of the invention include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that typically fiber breakage occurs as a result of shear forces within the extruder. Therefore the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

Polymer Resin

Polymer resins used with embodiments herein can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV—ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230 C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (DI/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). Immiscible or non-alloyed blend of polymers typically displays two or more glass transition temperatures associated with immiscible polymer phases.

Polymeric resin materials herein can retain sufficient thermoplastic properties to permit melt blending with fiber, permit formation of extruded articles or other extrudates such as pellets, and to permit the composition material or pellet to be extruded or injection molded in a thermoplastic process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated as least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide) and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book Poly(Lactic Acid) Synthesis, Structures, Properties, Processing, and Applications, Wiley Series on Polymer Engineering and Technology, 2010.

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F.

The polymer resin can make up the largest share of the extruded composition. In some embodiments, the polymer resin is at least about 20, 25, 30, 35, 40, 45, 50, 55, 60, 65, 70, 75, 80, 85, 90, 95, 98, or 99 wt. % of the extruded composition. In some embodiments, the amount of polymer resin in the composition can be in a range wherein any of the foregoing numbers can serve as the upper or lower bound of the range, provide that the upper bound is larger than the lower bound.

Impact Modifiers

Embodiments herein can include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical. Exemplary acrylic impact modifiers are described in U.S. Pat. Nos. 5,773,520; 7,173,082; 7,915,346; 8,378,013; and 8,816,008; the content of which is herein incorporated by reference.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, ethylene-n-butyl acrylate-carbon monoxide. Exemplary impact modifier copolymers can include those sold under the tradename ELVALOY, commercially available from DuPont.

A particular class of impact modifiers used herein are referred to as core-shell impact modifiers. Exemplary core-shell impact modifiers can exist as a particulate and can include a first material serving as the core and a second material disposed around the core, in some cases encapsulating the core. In some cases, the shell material can be grafted onto and thus covalently bonded with the material of the core. In other embodiments, the shell material may not be covalently bonded with the material of the core.

In various embodiments, the core-shell impact modifier can include a glassy shell and an elastomeric core. Exemplary core-shell impact modifiers can have a diameter of about 5 nm, 10 nm, 25 nm, 50 nm, 80 nm, 100 nm, 150 nm, 200 nm, 250 nm, 300 nm, 400 nm, 500 nm, 1 μm, or 2 μm. In some embodiments, the diameter of the core-shell impact modifier can be in a range wherein any of the foregoing sizes can serve as the upper or lower bound of the range, provided that the upper bound is greater than the lower bound.

In some embodiments, the first material, or core material, can be a polymer or copolymer that has a Tg of less than 0, −10, −20, −30, −40, −50, or −60 degrees C. and/or rubbery. In some embodiments, the Tg can be in a range wherein any of the foregoing Tg values can serve as the upper or lower bound of the range, provided that the upper bound is greater than the lower bound.

Exemplary polymers of the first material, or core material, can include copolymers or homopolymers including acrylates including (acrylate, methyl acrylate, ethyl acrylate, isobutyl acrylate, n-butyl acrylate, 2-ethyl hexyl acrylate, 2-octylacrylate, and the like), butadiene, styrene, acrylonitrile, and the like. In some embodiments, exemplary polymers of the first material can specifically include butadiene-styrene, acrylonitrile-butadiene-styrene, and acrylates.

The polymers of the second material can be incompatible with exemplary polymers of extrusions herein such as polyvinylchloride. In some embodiments, polymers of the first material can have a surface energy and/or polarity that makes it incompatible with exemplary polymers of extrusions herein such as polyvinylchloride. In some embodiments, polymers of the first material can be cross-linked.

In some embodiments, the second material, or shell material, can be a polymer or copolymer that is generally glassy (having a Tg of greater than 5, 10, 20, 30, 40, 50, 60 or 70 degrees C.) and/or hard. In some embodiments, the Tg can be in a range wherein any of the foregoing Tg values can serve as the upper or lower bound of the range, provided that the upper bound is greater than the lower bound.

Exemplary polymers of the second material can include poly(methyl methacrylate) (MMA) or a copolymer including the same. The polymers of the second material can be compatible with exemplary polymers of extrusions herein such as polyvinylchloride. As such, the polymers of the second material can have a surface energy and/or polarity that is more compatible with polymers such as polyvinylchloride than are the first materials described above. In some embodiments, polymer of the first material can be non-crosslinked.

Exemplary core-shell impact modifiers herein can specifically include MBS (methacrylate-butadiene-styrene), ABS (acrylonitrile-butadiene-styrene) and all acrylic (AIM) impact modifiers such as acrylic-methacrylic. In various embodiments, the impact modifier comprises a methyl methacrylate shell and an acrylate core.

In some embodiments, the impact modifier can be a 100 wt. % acrylic impact modifier. As used herein, the term 100 wt. % acrylic impact modifier shall refer to an impact modifier wherein the monomers used to form the polymers (homopolymers, copolymers, etc.) are all acrylates, but not necessarily all the same type of acrylate. In some embodiments, the impact modifier can be at least 60, 70, 80, 90, 95 or 98 wt. % acrylic.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to 25 phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

It will be appreciated that standard guidance for the use of impact modifiers includes reference to the use of an amount of impact modifier of less than or equal to 5 phr. The use of high levels of impact modifiers can be cost inefficient, can potentially reduce some aspects of material strength, and in many compositions does not provide additional impact modifying benefits. Indeed, example 2 below shows that levels of impact modifier above 5 phr failed to enhance impact resistance in the context of PVC lacking fibers or particles.

However, it has been surprisingly discovered that in various embodiments of compositions herein the use of impact modifiers at levels higher than 5 phr can provide additional benefits. As an example, it is shown below that the use of impact modifiers at concentrations of greater than 5 phr can increase impact resistance beyond what can be achieved by the inclusion of 5 phr of impact modifier.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to 20 phr. In some embodiments, the composition can include an amount of impact modifier of greater than or equal to 8 phr and less than or equal to 20 phr. In some embodiments, the composition can include an amount of impact modifier of greater than or equal to 10 phr and less than or equal to 20 phr.

Particles

Optionally, some embodiments herein can include particles as a part of the compositions that are extruded. However, other embodiments may include no such particles.

Descriptions herein of exemplary particles are only applicable for the description of embodiments herein and not for other patents or patent applications of the applicant and/or inventors unless explicitly stated to the contrary.

Particles can include both organic and inorganic particles. Such particles can be roughly spherical, semi-spherical, block-like, flake shaped, disc shaped or the like. Particles herein can have substantial variation. As such, the particles added to compositions in some embodiments can form a heterogeneous mixture of particles. In other embodiments, the particles can be substantially homogeneous.

In some embodiments, particles herein can have an average (such as number average) aspect ratio of between about 15:1 and about 1:1. In some embodiments, particles herein can have an average aspect ratio of between about 10:1 and about 1:1. In some embodiments, particles herein can have an average aspect ratio of between about 4:1 and about 1:1.

In various embodiments, the particles can be, on average, from about 0.01 mm to about 8 mm in their largest dimension. In various embodiments, the particles can be from about 0.25 mm to about 5 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, composites, or the like, and combinations of these. Polymers for the particles can include both thermoset and thermoplastic polymers.

Particles herein can specifically include particles comprising substantial portions of lignin and cellulose (lignocellulosic materials), such as wood particles or wood flour. Wood particles can be derived from hardwoods or softwoods. In various embodiments, the wood particles can have a moisture content of less than about 8, 6, 4, or 2 percent. In various embodiments, the wood particles can be a heterogeneous mixture wherein between 20 and 70 weight percent of the particles are 60 Mesh (corresponding to a pore size of 0.25 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles. Also, the particles may be treated in various ways to improve adhesion to the polymeric materials, reduce moisture effects, or provide other useful properties.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition can be greater than or equal to about 0, 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition can be less than or equal to about 80, 75, 70, 65, 60, 55, 50, 45, 40, 35, 30, 25, 20, 15, 10, 5, 1, or 0 weight percent. In some embodiments, the amount of particles can be in a range wherein each of the foregoing numbers and serve as the upper or lower bound of the range provided that the upper bound is larger than the lower bound.

Other Components

It will be appreciated that various other components can be extruded with compositions herein and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various type of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. %, based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

Methods

Methods herein can include various procedures. By way of example, methods can include one or more of mixing, compounding, gas removal, moisture removal, and final extrusion. Materials can be mixed using a variety of mixing means, including extruder mechanisms wherein the materials are mixed under conditions of high shear until the appropriate degree of wetting and intimate contact is achieved. In some embodiments, the moisture content can be controlled at a moisture removal station. By way of example, the heated composite is exposed to atmospheric pressure or reduced pressure at elevated temperature for a sufficient period of time to remove moisture resulting in a final desired moisture content. In some embodiments, the final moisture content is about 8 wt. % or less.

In some cases, inputs are fed directly, without a compounding step, into an extruder (including but not limited to single screw, double screw, co-rotating, counter-rotating or the like) that produces the final product, such as a profile extrusion. In other cases, the inputs can be first processed with a compounding extrusion step, wherein the inputs are mixed together and run through a compounding extruder which provides for high levels of mixing and interaction of components. While various extruders can be used for compounding, typically twin-screw extruders are used in either co-rotating or counter-rotating configurations. In some embodiments, a compounding operation can be referred to as a pelletizing operation as the output from the compounding operation is typically pellets.

The articles herein can be formed by known extrusion (including co-extrusion) techniques, pultrusion techniques, and the like. At its most basic level, extrusion is the process of producing continuous articles by forcing a material through a die. The extruded article can be of various shapes depending on the extrusion die geometry.

Profile extrusion refers to the process of making continuous shapes by extrusion. The term "profile extrusion" also refers to the resultant article formed during the profile extrusion process. In certain embodiments, the article, which is particularly in the form of a building component, is in the form of a profile extrusion. In some embodiments, profile extrusion can exclude the formation of sheets.

In addition, a process called co-extrusion can be used herein and refers to a process whereby two or more polymeric materials, each extruded separately, are joined in a molten state in the die. In these applications, the co-extruded surface layer can be referred to as a capping layer or capstock. In some embodiments, compositions herein can be extruded in the form of a capping layer over non-thermoplastic materials such as wood, thermosets, or metal.

In some embodiments, materials herein, including but not limited to capping layers can be painted or otherwise coated. Coatings can be applied to substrates for aesthetic reasons as well as for protection to prevent excessive moisture or UV radiation penetration. Coatings such as paints and the like can be applied in various ways including spray coating, dip coating, brush coating, and the like. Such coatings can include various components including, but not limited to, pigments, binders (including polymeric binders), alkyd resins, vinyl and acrylic emulsions, epoxy resins, polyurethanes, and solvents. The thickness of the coating layer can vary. In some embodiments, the coating layer can be from 0.001 inches (0.0254 mm) (0.0508 mm) to 0.020 inches (0.508 mm), or from 0.002 (0.0508 mm) to 0.01 inches (0.254 mm). Embodiments herein can serve as ideal substrates to which to apply a coating such a paint layer or a primer and paint layer. In some embodiments, compositions herein with reduced surface defect depths can be disposed on the outside surface of an extrusion or coextrusion and then be painted or otherwise coated in a procedure after extrusion.

In some embodiments, compositions herein can be extruded in particular wall segments (internal or external) such that the placement provides reinforced strength or other benefits identified through Finite Element Analysis (FEA). By way of example, the composite material herein can be used in applications wherein the desirable strength is known through FEA modeling and applied only in those specific areas to enhance lineal performance or extruded specifically in a particular lineal within a unit assembly to enhance unit performance.

The articles herein can be in the form of a profile that has been formed by an extrusion process (referred to herein as a "profile extrusion"), including, in some embodiments, a co-extruded layer or capping material (e.g., over another material such as a wood window or door component). The articles herein can be in the form of an extruded article, a pultruded article, or a combination thereof.

One exemplary piece of equipment for mixing and extruding the compositions herein is an industrial extruder device. Such extruders can be obtained from a variety of manufacturers.

Referring now to FIG. 1, a diagram of an exemplary compounding extruder system 104 is shown. Particles, if used, fibers and polymer resin can be fed into compounding extruder 104 using a gravimetric metering feeder 101, 102, or 103 or other type of feeder. The compounding extruder can be run at various speeds and temperatures. In some embodiments, it can be run at 50-500 rpm and be heated to approximately 150 to 300 degrees Celsius. The particles, fibers and polymer resin can be heated to approximately 140 to 190 degrees Celsius as they pass through melting section 105, mixed at approximately 160 to 190 degrees Celsius as they pass through mixing section 106, and then water vapor and other off gases can be allowed to escape through venting section 107 at approximately 160 to 190 degrees Celsius.

The composite can be further compounded at pumping section 108 at approximately 155 to 195 degrees Celsius. The screw can compress the molten composite and feed it into a pelletizing die. The pelletizing die can produce small pellets of composite.

In some embodiments, a stranding method can be used for pelletizing. By way of example, material can be fed from a barrel section into a two-hole strand die. The strands can then be dropped into a chilled water bath, in some cases at approximately 8° C., to cool sufficiently to solidify. After exiting the water bath, the strands can be pulled through two air wipes to remove any water. Then the strands can then be pulled into a pelletizing strand cutter to create the final pellets.

Figure 2:
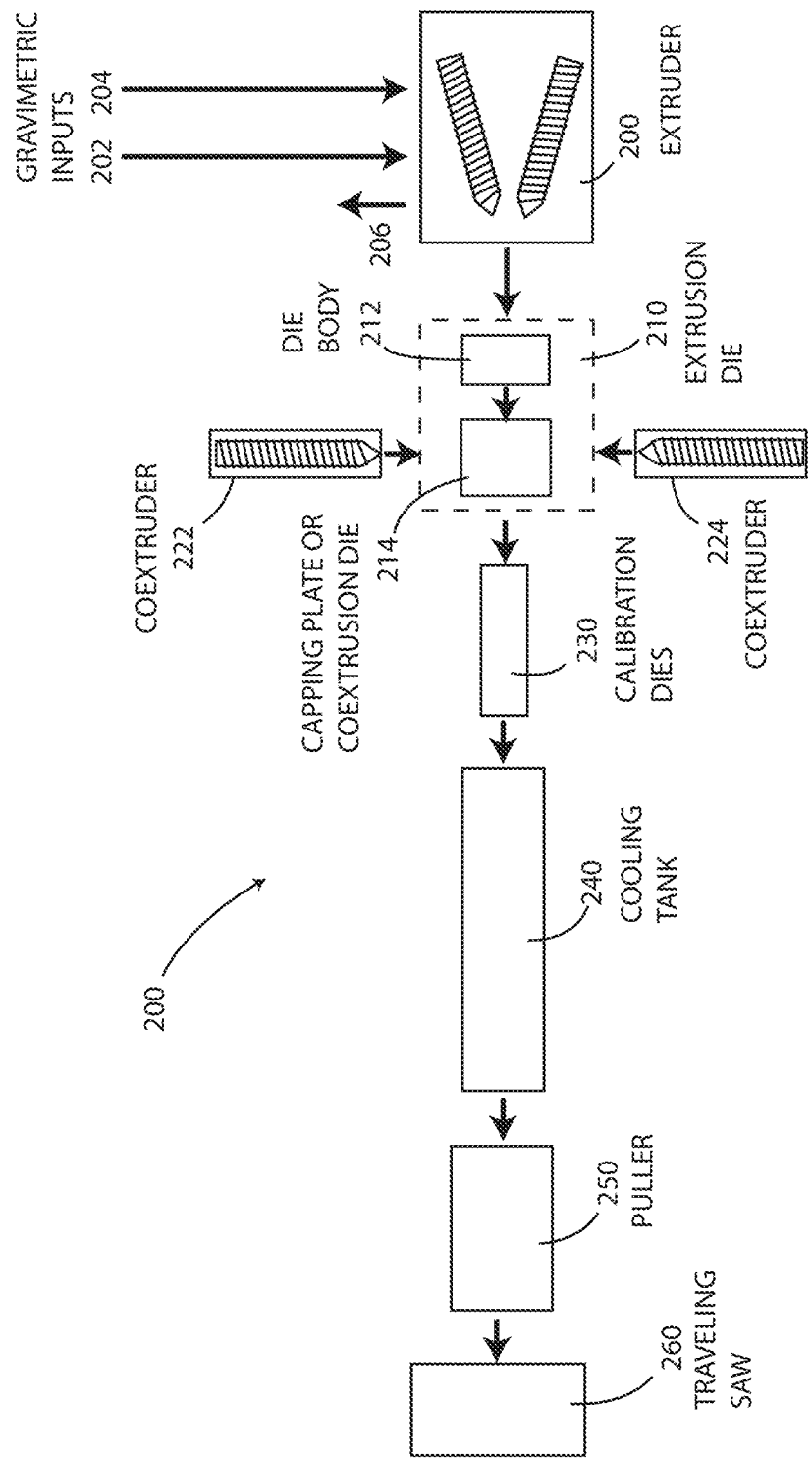
FIG. 2 is a schematic diagram of an exemplary extruder for producing extrudates herein.

Referring now to FIG. 2, a diagram of an exemplary extruder 200 for producing extrudates, such as profile extrusions is shown. Pellets produced in a compounding step, or materials not having been compounded, can be fed into an extruder to produce profile extrusions. The extruder 200 can be a conical or parallel twin screw extruder with gravimetric or volumetric feeders 202 and 204 for feeding both primary materials and additive and/or reclaimed materials to the extruder. The extruder 200 can be equipped with a vacuum port or vent 206 for controlled devolatilization of (removal of moisture from) the molten material. Heating and other temperature adjustments and controls conventional to extrusion equipment can be included.

An extrusion die 210 can be made up of a primary die body 212 and capping plate(s) or coextrusion die 214, which can be used to coextrude a second layer which could be placed within the internal cavities of or an outer or capping layer onto a base extrusion. Coextrusion die 214 can be fed by extruders 222 and 224, each of which can apply a different material or a capping material to two adjacent sides of the base extrusion. The coextruded material applied by extruders 222 and 224 can be the same or different. The coextruded material applied by extruders 222 and 224 is not limited to a volume less than from extruder 200. The option of coextruding a capping material or not coextruding a capping material can be selected by turning coextruders 222 and 224 on or off as needed.

While FIG. 2 illustrates two coextruders, it will be appreciated that the number of coextruders can vary. By way of example, there can be from 0 to 10, or more, coextrusion streams. In some embodiments, there can be from 1 to 8 coextrusions streams, or 2 to 6.

The extruder 200 can further include a conventional calibration die 230 for applying a vacuum to size and maintain the desired final shape of the extruded member as the members began to cool. After calibration, the extruded member can pass through cooling tank 240, optionally aided by a puller 250, which can be a pair of sectioned belts of conventional design. Finally, the continuous extruded member can be cut into 4 foot lengths by traveling cut-off saw 260, also of conventional design, wherein the saw traveled with the extrusion while sawing, to allow continuous operation of the extruder during sawing.

In various specific embodiments, methods herein can include a method of making an extruded article. The method can include compounding materials including, but not limited to, a polymer resin, an impact modifier, and fibers into pellets. In some embodiments, the materials include a polymer resin, an impact modifier in an amount greater than or equal to 5 phr, and fibers. The method can further include extruding the pellets, with or without further additives, to form a first portion of an extruded article. In some embodiments, the first portion can have a surface exhibiting an average depression depth of less than 0.0045 inches (0.1143 mm).

Included herein is also a method of making an extruded article including extruding a first composition, with or without previous compounding, to form the extruded article. The extruded article can include a surface exhibiting an average depression depth of less than 0.0045 inches (0.1143 mm). The first composition can include a polymer resin, an impact modifier and fibers.

The line speed of the extrusion can vary based on a number of factors. However, as a general rule, it can be more difficult to achieve greater surface smoothness (or lower average depression depth) at faster line speeds. In part, this can be explained by the increasing thermal fluctuations traditionally seen in composites at these higher speeds. The compositions shown here have been seen to reduce the overall requirement of heat energy input to the system and improve the stability of the resultant melt enabling successful increases in line speed. As such, a remarkable aspect of the compositions herein is that a reduced depth of surface depressions is obtainable even in the context of relatively high line speeds. In some embodiments, the line speed is greater than or equal to 1, 2, 3, 4, 5, 10, 15, 20, 25, 30, 40 or 50 feet per minute. In some embodiments, the line speed is less than or equal to 150, 100, 75 or 50 feet per minute. In some embodiments, the line speed can fall in a range wherein any of the foregoing speeds can serve as the upper or lower bound of the range provided that the upper bound is larger than the lower bound.

In some embodiments, the RPM of the screw or screws can be greater than or equal to about 1, 3, 5, 7, 9, 11, 13, 15, 17, 19, or 21 RPM. In some embodiments, the RPM of the screw or screws can be less than or equal to about 29, 27, 25, 23, 21, 19, 17, 15, 13, or 11 RPM. In various embodiments, the RPM of the screw or screws can be in a range wherein any of the foregoing numbers can serve as the upper or lower bound of the range, provided that the upper bound is larger than the lower bound. In some embodiments, the RPM of the screw or screws can be from about 5 to about 25 RPM.

Functional Properties

Extrudates in accordance with embodiments herein (including articles and specifically profile extrusions) can exhibit desirable properties in terms of impact resistance, strength, and the like.

In various embodiment, extrudates herein can exhibit a Gardner impact resistance of greater than 0.2 in*lb/mil. In some embodiments, extrudates herein can exhibit a Gardner impact resistance of greater than 0.4 in*lb/mil. Gardner impact can be assessed in accordance with ASTM D4226-09.

In various embodiments, extrudates herein can exhibit a Regular Izod Impact value of greater than 100, 150, 200, 250, 300, 350, 400, 450, 500, 550, 600, 650, 700, 750, 800, 850, 900, 950, or 1000 J/m. In some embodiments, the Regular Izod Impact value can be less than 3000 J/m. Regular Izod Impact value can be measured in accordance with ASTM D256.

In various embodiments, extrudates herein can exhibit a flexural modulus of greater than 500,000, 550,000, 600,000, 650,000, 700,000, 750,000, 800,000, 850,000, 900,000, 950,000, 1,000,000, 1,100,000, 1,200,000, 1,300,000, 1,400,000, or 1,500,000 PSI. In some embodiments, the flexural modulus can be less than 4,000,000 PSI. Flexural modulus can be measured in accordance with ASTM D790 (D790-15e2).

In various embodiments, extrudates herein can exhibit a flexural strain of greater than 0.001, 0.005, 0.01, 0.015, 0.02, 0.025, 0.03, 0.04, 0.06, 0.08, or 0.1 in/in. In some embodiments, the flexural strain can be less than or equal to 1 in/in. Flexural strain can be measured in accordance with ASTM D790 (D790-15e2).

In various embodiments, extrudates herein can exhibit a flexural yield strength of greater than 3,000, 5,000, 7,000, 9,000, 11,000 13,000, 15,000, 17,000, or 19,000 PSI. In some embodiments, the flexural yield strength can be less than 40,000 PSI. Flexural yield strength can be measured in accordance with ASTM D790 (D790-15e2).

In various embodiments, extrudates herein can exhibit a tensile modulus of greater than 500,000, 550,000, 600,000, 650,000, 700,000, 750,000, 800,000, 850,000, 900,000, 950,000, or 1,000,000 PSI. In some embodiments, the tensile modulus can be less than 4,000,000 PSI. Tensile modulus can be measured in accordance with ASTM D638 (D638-14).

In various embodiments, extrudates herein can exhibit a max tensile strain of greater than 0.1, 0.5, 1.0, 1.5, 2.0, 2.5, 3.5, 4.0, 5.0, 7.0, or 10.0%. Max tensile strain can be measured in accordance with ASTM D638 (D638-14).

Surface Properties

In various embodiments, surfaces formed with compositions herein can exhibit reduced surface depression depth. In some embodiments, one or more surfaces of extrudates herein can exhibit an average depression depth of less than 0.0045 inches (0.1143 mm). In some embodiments, such surface can exhibit an average depression depth of less than 0.004, 0.0035, 0.003, 0.0025, 0.002, 0.0015, or 0.001 inches (0.1016, 0.0889, 0.0762, 0.0635, 0.0381, or 0.0254 mm).

Articles

Compositions herein can be used for extrusion processes for forming articles including building components, such as structural and decorative members, including, but not limited to, those used in windows, doors, railings, decking, siding, flooring, fencing, trim and other building products. In particular embodiments, fenestration components, such as window and door components are included.

Embodiments of compositions herein can be used to manufacture structural extruded articles such as rails, jambs, frames, stiles, sills, tracks, stop and sash. Embodiments of compositions herein can be used to manufacture nonstructural extruded articles such as trim elements including grid, cove, bead, quarter round, and the like. Other components can include extenders, grilles, mull posts, panels and the like. In some embodiments, compositions herein can be used to manufacture capping materials for any of the foregoing elements. In some embodiments, the structural element is a rigid structural member. In some embodiments the structural element can be used as an insert placed within an extruded profile hollow during assembly for additional structural performance.

Figure 3:
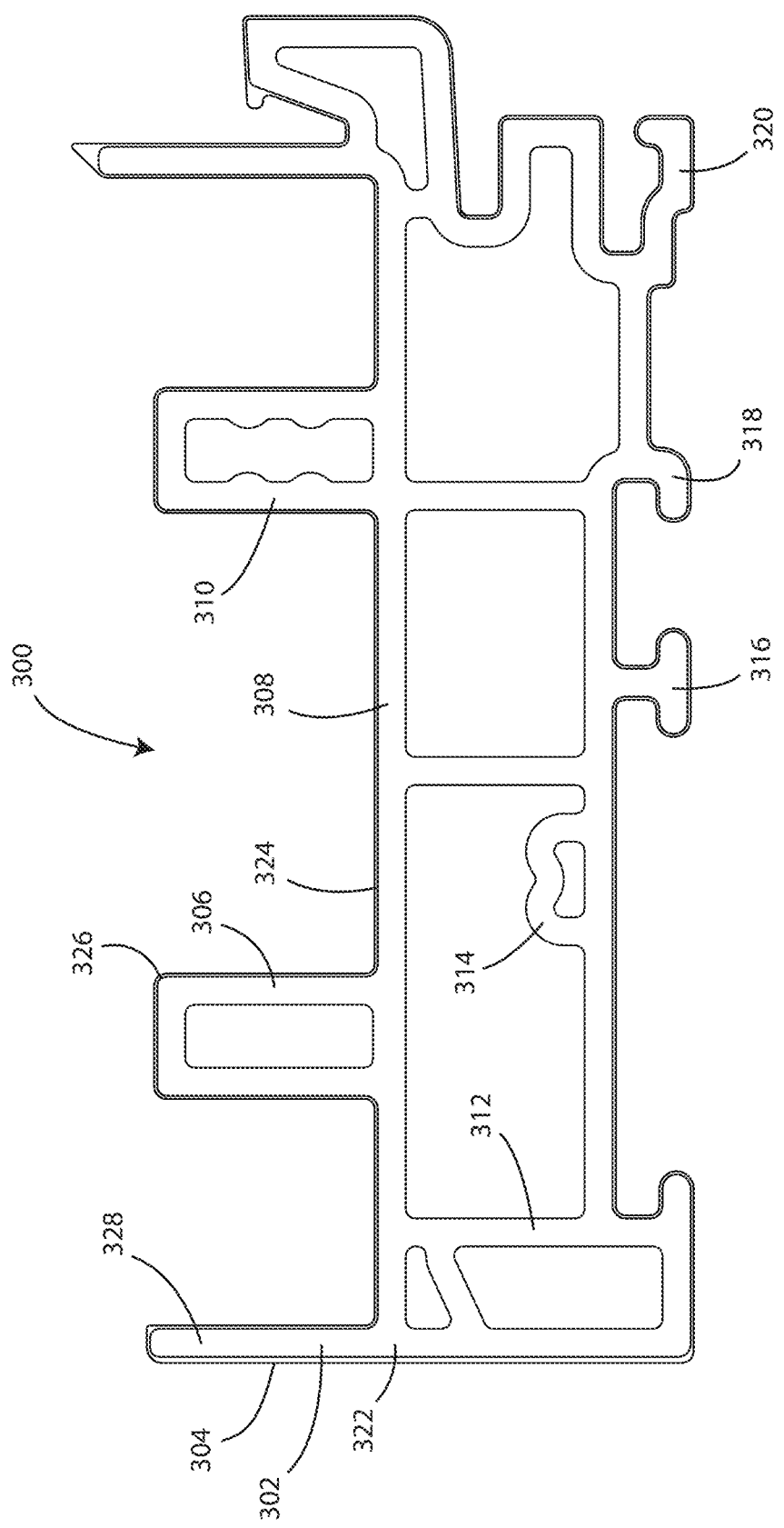
FIG. 3 is a cross-sectional view of a profile extrusion in accordance with various embodiments herein.

Referring now to FIG. 3, a cross-sectional view of a profile extrusion 300 is shown in accordance with various embodiments herein. The profile extrusion 300 can include a substrate 302 or base extrusion and a capstock or cap layer 304. In many embodiments, the substrate 302 and the cap layer 304 are formed from different compositions and co-extruded together. It will be appreciated, however, that in some embodiments there is no cap layer 304. Alternatively, there can be more than two layers or portions of different materials forming articles herein.

Reference herein to a "first", "second", or "third" layer, portion or segment does not imply that one layer is physically beneath another or imply their position with respect to one another unless directly stated to. Rather, references to "first", "second" or "third" layers or portions are merely used to distinguish one layer, portion or composition from another.

Both the substrate 302 and the cap layer 304 can have various dimensions. In some embodiments, the cap layer 304 can be formed from a material that is relatively more expensive than the material of the substrate 302. As such, it can be economically desirable to minimize the thickness of the cap layer 304 while still keeping it thick enough to provide the intended properties.

Embodiments herein having reduced average depression depth can enable the use of thinner cap layers than are common. By way of example, in some embodiments, the cap layer can be from 0.001 inches (0.0254 mm) to 0.15 inches (3.81 mm). In some embodiments, the cap layer can be up to the full thickness of a wall. However, in some embodiments, the cap layer can be less than about 0.3, 0.25, 0.2, 0.15, 0.1, 0.05, or 0.025 inches thick (7.62, 6.35, 5.08, 3.81, 2.54, 1.27, or 0.635 mm respectively). In some embodiments, the cap layer is about 0.005 inches (0.127 mm) to about 0.02 inches (0.508 mm) thick. In some embodiments, the cap layer is about 0.01 inches (0.254 mm) thick.

The profile extrusion 300 can include a number of different parts including internal walls 312 and 314, external walls 306, 308, and 310, and legs or single wall appendages 316, 318, and 320. In some embodiments, these different parts can be formed from the same composition. In other embodiments, these parts can be formed from different compositions. By way of example, in some embodiments, external walls can be formed from compositions having reduced surface depression depth while purely internal walls can be formed from materials having greater surface depth variability. However, as reduced surface depression depth may have beneficial properties for various functional properties (including impact resistance), it will be appreciated that such materials can also be used for interior walls and/or selectively in various parts of the extrusion geometry.

Profile extrusion 300 also includes areas where an internal wall meets an external wall 322 (or joint between an internal and external wall), highly visible external walls segments 324, areas having a tight radius of curvature 326, such as corners, and single wall areas 328 (as one example of a segment where in during convention extrusion a vacuum can only be pulled on one side). If such segments have surface depth depressions, they can require increased thicknesses of a capstock layer to diminish their uneven appearance. As such, in various embodiments, one or more of those areas can be formed from compositions herein with fewer surface depressions and/or surface depressions with less depth than would otherwise be expected. In particular, such areas can have an average depth of surface depressions as described elsewhere herein.

Figure 4:
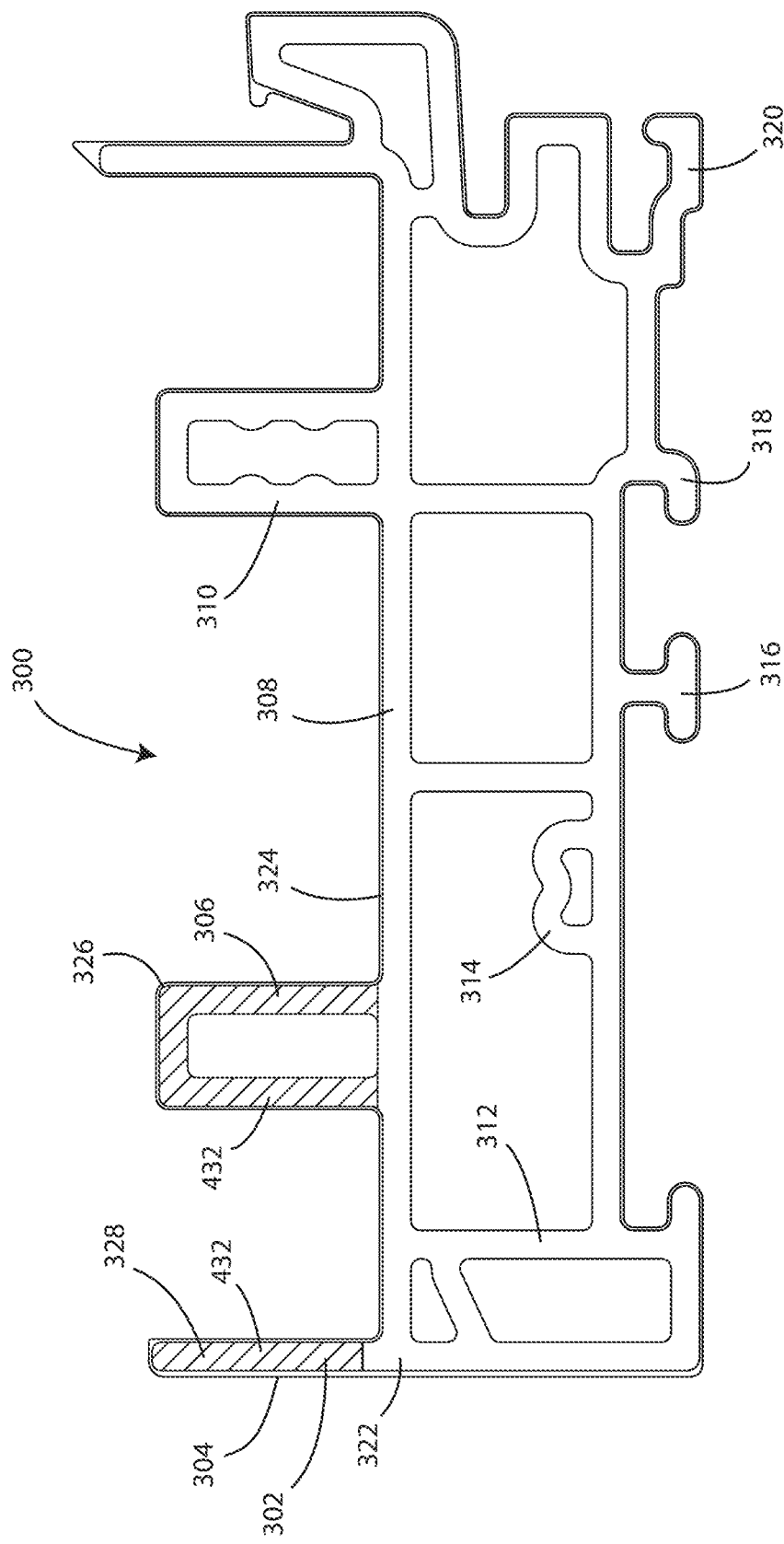
FIG. 4 is a cross-sectional view of a profile extrusion in accordance with various embodiments herein.

Referring now to FIG. 4, the profile extrusion 300 is shown wherein a single wall area 328 is formed from a composition 432 in accordance with various embodiments herein exhibiting reduced depth of surface depressions and/or increased surface impact resistance. In addition, an area having a tight radius of curvature 326 is formed from a composition 432 in accordance with various embodiments herein exhibiting reduced depth of surface depressions and/or increased surface impact resistance. In some embodiments, only specific segments such as 326 and 328 (in the example of FIG. 4 or other segments previously referenced) are formed from the composition herein exhibiting reduced depth of surface depressions and/or increased surface impact resistance while other portions are formed from other composites.

Figure 5:
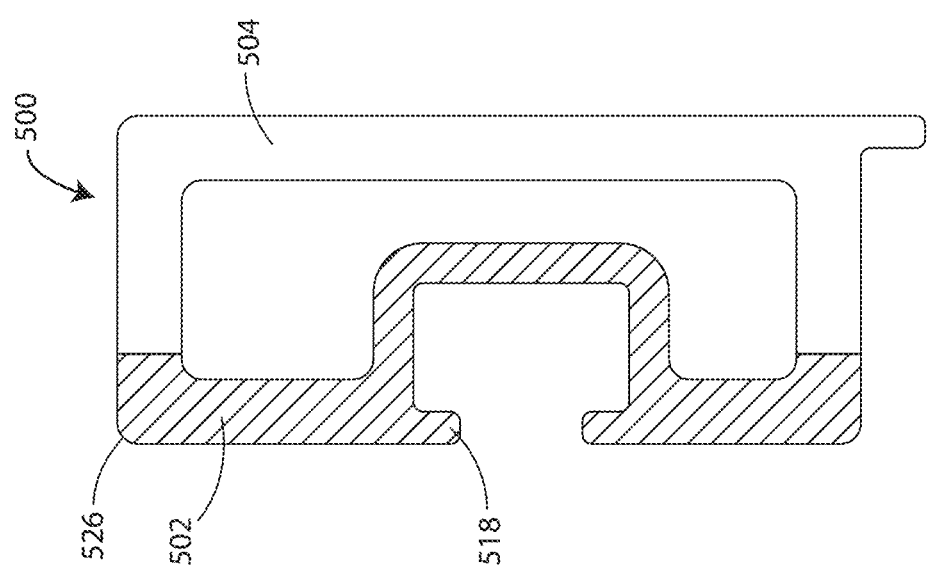
FIG. 5 is a cross-sectional view of a profile extrusion in accordance with various embodiments herein.

Referring now to FIG. 5, a profile extrusion 500 is shown in accordance with various embodiments herein. The profile extrusion 500 includes various structural features including, but not limited to, areas with a tight radius of curvature 526 (such as corners) and single wall appendages 518. The profile extrusion can include a first portion 502 formed from a first composition, such as those described herein having enhanced properties, and a second portion 504 formed from a second composition that is different than the first composition. In various embodiments, features such 526 and 518 can be formed with the first composition, while other features are formed from a different composition. However, it will be appreciated that in some embodiments all of the features can be formed with the first composition. In various embodiments, selected segments of the profile extrusion are formed from the first composition having enhanced properties.

Figure 6:
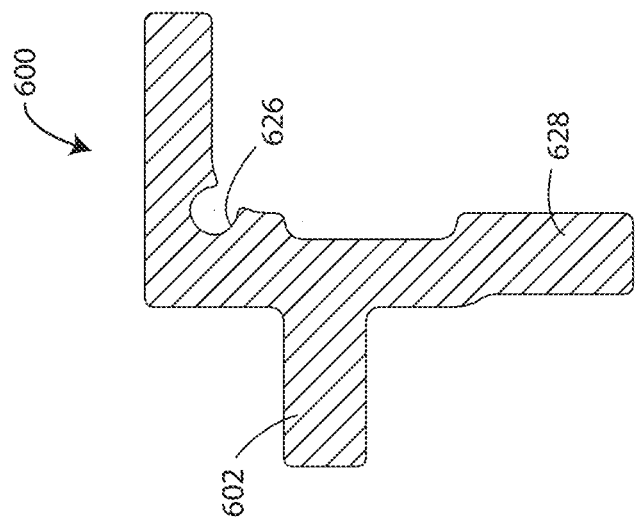
FIG. 6 is a cross-sectional view of a profile extrusion in accordance with various embodiments herein.

Referring now to FIG. 6, a profile extrusion 600 is shown in accordance with various embodiments herein. The profile extrusion 600 is an example of an insert, in that it would, in many cases, be designed to fit within a hollow portion of another extrusion. The profile extrusion 600 includes various structural features including, but not limited to, areas with a tight radius of curvature 626 (such as corners) and single wall portions 628. The profile extrusion 600 can be formed from a first composition 602.

Figure 7A:
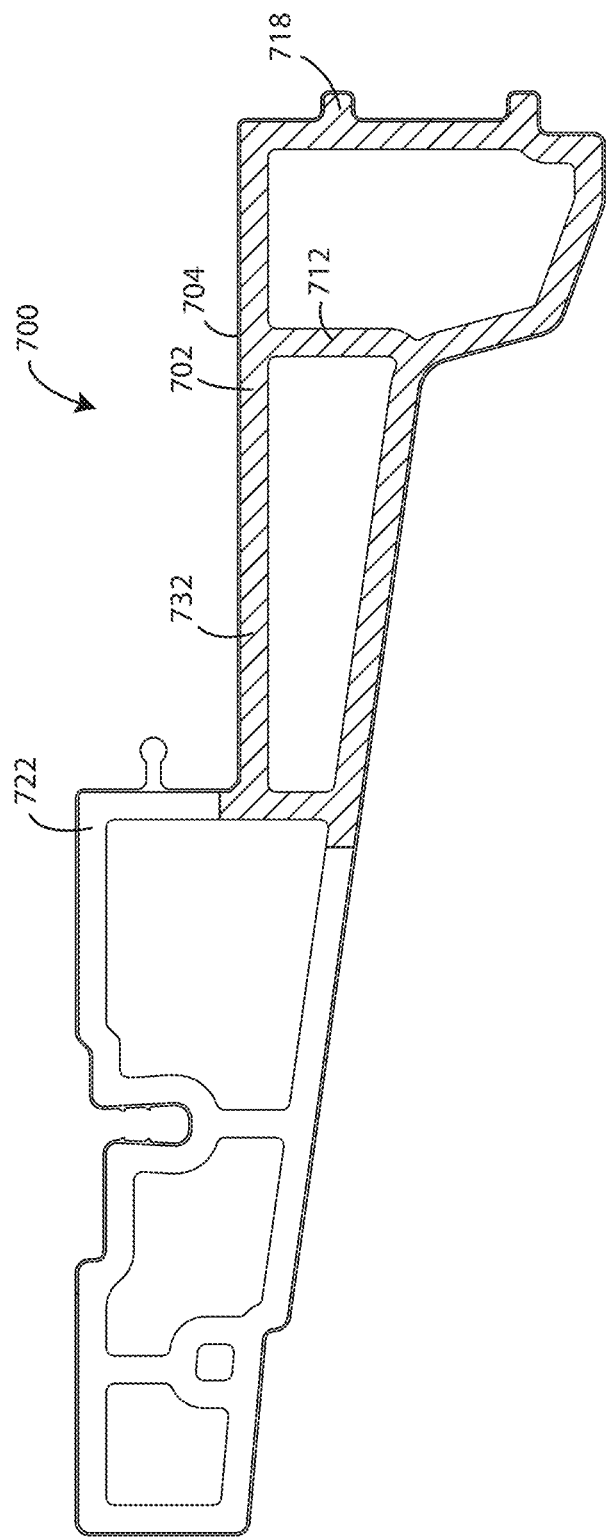
FIG. 7A is a cross-sectional view of a profile extrusion in accordance with various embodiments herein.

Referring now to FIG. 7A, a profile extrusion 700 is shown in accordance with various embodiments herein. The profile extrusion 700 includes various structural features including, but not limited to, areas such as single wall appendage 718 and interior wall 712. The profile extrusion can include a substrate 702 and a cap layer 704. The substrate 702 can include a first portion 732 formed from a first composition, such as those described herein having enhanced properties, and a second portion 722 formed from a second composition that is different than the first composition.

Figure 7B:
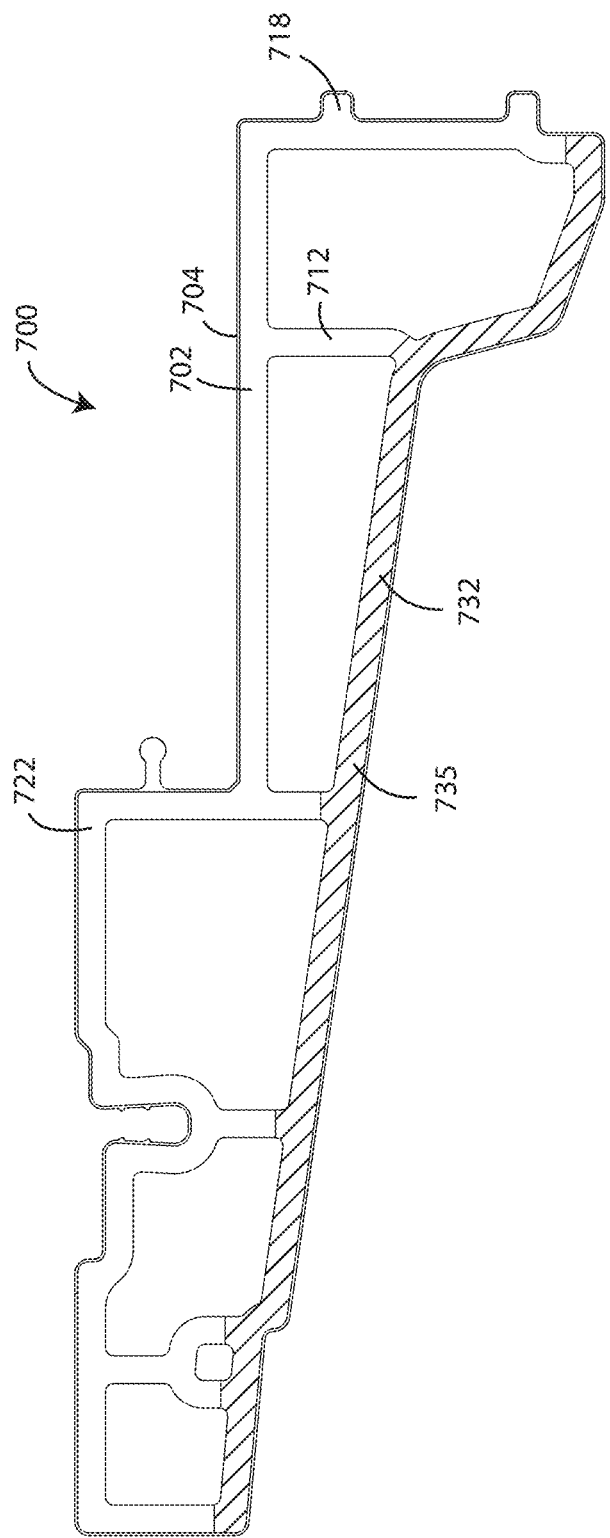
FIG. 7B is a cross-sectional view of a profile extrusion in accordance with various embodiments herein.

Referring now to FIG. 7B, a profile extrusion 700 is shown in accordance with various embodiments herein. The profile extrusion 700 includes various structural features including, but not limited to, areas such as single wall appendage 718 and interior wall 712. The profile extrusion 700 can also specifically include a highly visible external wall 735. The profile extrusion can include a substrate 702 and a cap layer 704. The substrate 702 can include a first portion 732 formed from a first composition, such as those described herein having enhanced properties, and a second portion 722 formed from a second composition that is different than the first composition. Notably, the substrate of the highly visible external wall 735 can be part of the first portion and be formed from the first composition.

Figure 8:
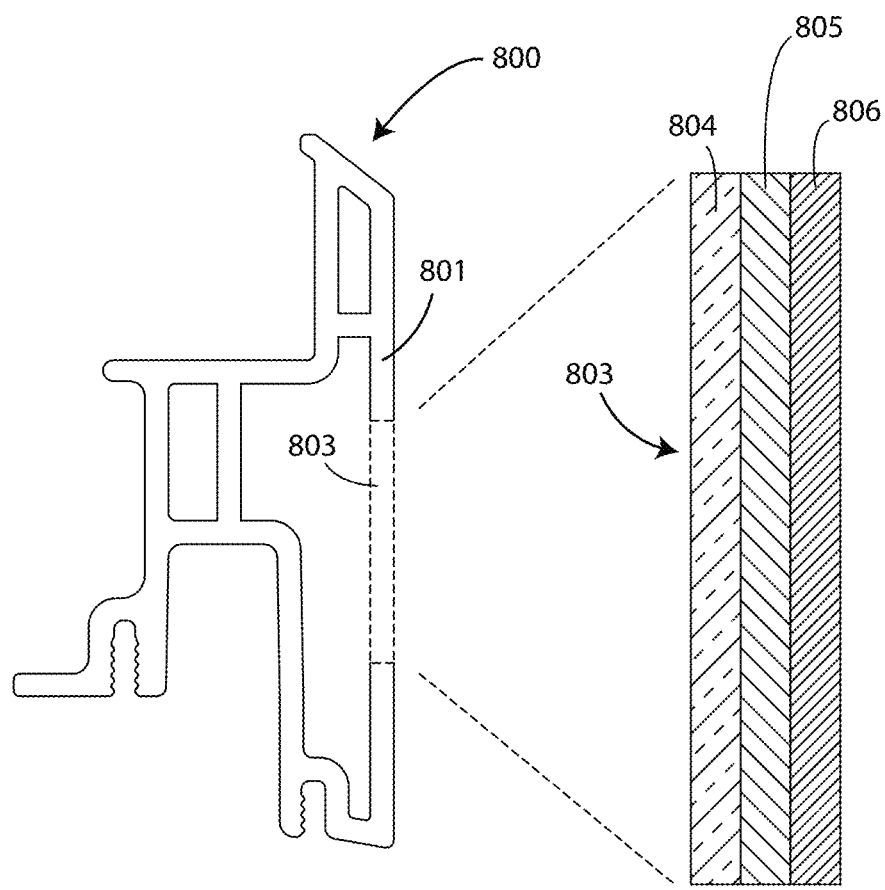
FIG. 8 is a cross-sectional view of a profile extrusion in accordance with various embodiments herein.

Beyond the use of compositions herein to form different segments or portions of the extrudate, such as illustrated with regard to FIGS. 4, 5, 7A and 7B, it will be appreciated that compositions herein can be used to form layers that can be combined with layers formed from other compositions. Referring now to FIG. 8, a cross-sectional view of a profile extrusion 800 is shown in accordance with various embodiments herein. The profile extrusion 800 can include an external wall 801. A portion 803 of the external wall 801 is shown expanded to illustrate its configuration of layers. In specific, the portion 803 of external wall 801 can include a substrate layer 804, a reduced surface depression depth and enhanced impact layer 805, and a capstock layer 806. The substrate layer 804 can be a lower cost substrate material. In various embodiments, the substrate layer 804 can be, for example, a material including PVC and wood but lacking an impact modifier. The reduced surface depression depth and enhanced impact layer 805 can be formed from compositions described herein. The capstock layer 806 can be a relatively thin layer exhibiting desirable properties for the surface of an extrudate. The capstock layer 806 can be formed from materials such as PVC, acrylic, or other polymers, but substantially lacking particles as described herein or fibers as described herein.

Figure 9:
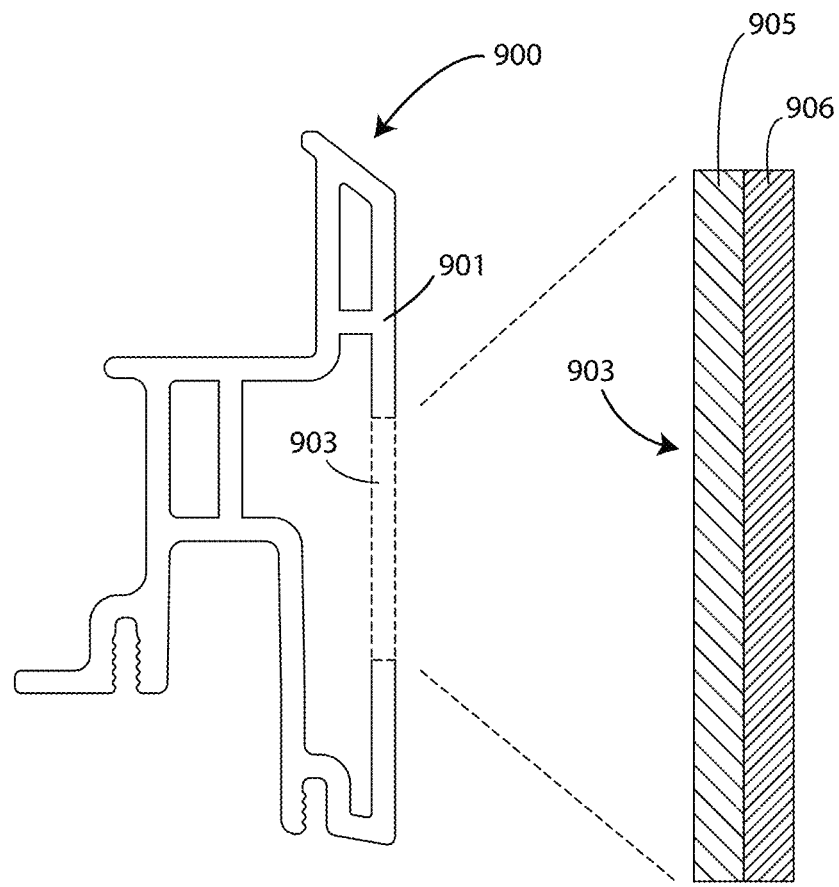
FIG. 9 is a cross-sectional view of a profile extrusion in accordance with various embodiments herein.

Referring now to FIG. 9, another cross-sectional view of a profile extrusion 900 is shown in accordance with various embodiments herein. The profile extrusion 900 can include an external wall 901. A portion 903 of the external wall 901 is shown expanded to illustrate its configuration of layers. In specific, the portion 603 of external wall 901 can include a substrate layer 905 and a capstock layer 906. In this embodiment, the substrate layer 905 can include materials as described herein exhibiting reduced surface depression depth and increased impact resistance. The capstock layer 906 can be formed of the same materials as described with respect to capstock layer 806 in FIG. 8.

Figure 10:
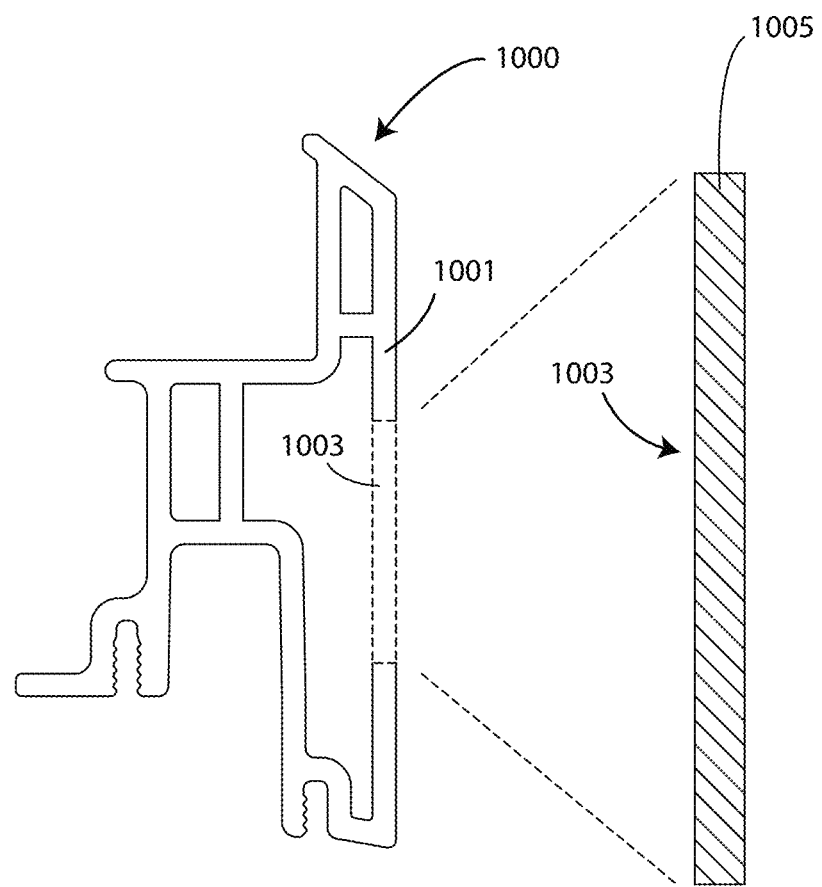
FIG. 10 is a cross-sectional view of a profile extrusion in accordance with various embodiments herein.

Referring now to FIG. 10, another cross-sectional view of a profile extrusion 1000 is shown in accordance with various embodiments herein. The profile extrusion 1000 can include an external wall 1001. A portion 1003 of the external wall 1001 is shown expanded to illustrate its configuration of layers. In specific, the portion 1003 of external wall 1001 can include a substrate layer 1005. In this embodiment, the substrate layer 1005 can include materials as described herein exhibiting reduced surface depression depth and increased impact resistance.

Aspects may be better understood with reference to the following examples. These examples are intended to be representative of specific embodiments, but are not intended as limiting the overall scope of embodiments herein.

EXAMPLES

Testing of extrudates in the following examples was conducted according to the following procedures:
Density
Density was measured using 60 gram samples of the pelletized material produced during compounding trials. Pellets were weighed and placed directly into an AccuPyc™ 1330 gas displacement pycnometer for density measurement. The gas used for testing was nitrogen.
Flexural Modulus
Flexural testing was performed according to ASTM D790-15e2 with the following modifications: samples used were of the size 1.0"×4.0"×0.125" (2.54 cm by 10.16 cm by 3.175 mm), support beams were spaced at a distance of 2" (5.08 cm) apart, and the crosshead speed for testing used was 0.5 in/min (12.7 mm/min). Specimens for testing were prepared by cutting samples directly from the extruded rectangular sample profiles. All testing was performed using an Instron 5500R tensile tester. Flexural modulus was calculated using the generated stress versus strain curve as outlined in ASTM D790-15e2.

Tensile Modulus

Tensile testing was performed according to ASTM D638-14 with the following modifications: samples used were of the size 1.0"×7.0"×0.125" (2.54 cm by 17.78 cm by 3.175 mm) and the crosshead speed for testing used was 0.05 in/min (1.27 mm/min). Specimens for testing were prepared by cutting samples directly from the extruded rectangular sample profiles. All testing was performed using an MTS Criterion Model 45 Universal Testing Machine. Tensile modulus was calculated using the generated stress versus strain curve as outlined in ASTM D638-14.

Gardner Impact Resistance

Gardner impact testing was performed according to ASTM D4226-09, procedure B using an H.250 tup and 0.64" (16.256 mm) collet. Samples for testing were extruded rectangular sample profiles having dimensions of 4"×4'× 0.125" (10.16 cm by 1.2 m×17.78 cm by 3.175 mm). Each sample was impacted 20 times and data was analyzed according to Bruceton staircase methodology as outlined in ASTM D4226-09.

Surface Depression Depth Measurement

The specimens were measured using a Keyence VHX-2000 Digital Microscope measured at room temperature in accordance with the manufacturers operating instructions. The specimens were measured using a VH-Z20R high performance lens. The lens was set to HDR in order to maximize the color gradation in the composite image.

In measuring, the sample is placed on the stage and depth composition is performed by moving the lens focus at a fixed speed from the lowest point to the highest point of the area to be observed. The composite image was subsequently displayed and depth measured in 3D using the profile graph to show the position and height of a given cross section. This depth was recorded on each sample (12"×4"×0.125"-30.48 cm by 10.16 cm×3.175 mm)) for 10 randomly identified locations across the extruded sample surface and the mean was taken. A sample mean was calculated from these locations on the basis that the extruded sample surface is such that there is a continuous topography of depth. Sample locations were sufficiently in from the edge of the extrusion in order to neglect any edge effects.

Components

TABLE 1

| Components | Identity | Specific Properties | Product ID | Supplier |
|---|---|---|---|---|
| Resin | PVC | Inherent Viscosity 0.88-0.92 | 225G PVC | Oxy |
| Fibers | Chopped Glass Fiber | Average Diameter = 14 micron; Average Length 4 mm (pre-extrusion); Aspect Ratio = 286:1 | 415A-14C | Owens-Corning |
| Impact Modifier | Impact Modifier | 100% acrylic (acrylic-methacrylic) | KM-X100 | Dow Chemical |
|  | Impact Modifier | Methylmethacrylate-Butadiene-Styrene (MBS) | Clear strength 223 | Arkema |
|  | Impact Modifier | 100% acrylic (acrylic-methacrylic) | Dura strength 527 | Arkema |
| Stabilizer | Tin Stabilizer |  | TM-182 | Rohm & Haas |
| Particles | Wood Particles | Size distribution: 20 Mesh - 0.01 wt. %, 40 Mesh - 8.08 wt. %, 60 Mesh - 43.12 wt. %, 80 Mesh - 27.16 wt. %; Pan - 21.64 wt. %; Aspect Ratios From 5:1 to 1:1. |  | American Wood |
| Process Aids | Calcium Stearate |  | Calcium Stearate F | Witco |
|  | Ester Blend in Paraffin Wax |  | XL623 | Amerilubes |

Vinyl Component Formulations

| Type | Wt. % | PHR | Name |
|---|---|---|---|
| PVC Component A | | | |
| Resin | 96.4% | 100 | Oxy Vinyl 225G Polyvinyl Chloride Resin |
| Calcium Stearate | 1.2% | 1.2 | Witco Calcium Stearate F |
| Specialty Lubricant | 1.4% | 1.5 | AmeriLubes XL623 Ester Blend in Paraffin Wax |
| Thermal Stabilizer | 1.0% | 1 | Rohm and Haas Stabilizer Tin Advastab TM-182 |
| Impact Modifier/ Processing Aid | 0.0% | 0 | Impact Modifier |
| PVC Component B | | | |
| Resin | 93.7% | 100 | Oxy Vinyl 225G Polyvinyl Chloride Resin |
| Calcium Stearate | 1.1% | 1.2 | Witco Calcium Stearate F |

-continued

| Type | Wt. % | PHR | Name |
|---|---|---|---|
| Specialty Lubricant | 1.4% | 1.5 | AmeriLubes XL623 Ester Blend in Paraffin Wax |
| Thermal Stabilizer | 0.9% | 1 | Rohm and Haas Stabilizer Tin Advastab TM-182 |
| Impact Modifier/ Processing Aid | 2.8% | 3 | Impact Modifier |

PVC Component C

| Type | Wt. % | PHR | Name |
|---|---|---|---|
| Resin | 92.0% | 100 | Oxy Vinyl 225G Polyvinyl Chloride Resin |
| Calcium Stearate | 1.1% | 1.2 | Witco Calcium Stearate F |
| Specialty Lubricant | 1.4% | 1.5 | AmeriLubes XL623 Ester Blend in Paraffin Wax |
| Thermal Stabilizer | 0.9% | 1 | Rohm and Haas Stabilizer Tin Advastab TM-182 |
| Impact Modifier/ Processing Aid | 4.6% | 5 | Impact Modifier |

PVC Component D

| Type | Wt. % | PHR | Name |
|---|---|---|---|
| Resin | 90.3% | 100 | Oxy Vinyl 225G Polyvinyl Chloride Resin |
| Calcium Stearate | 1.1% | 1.2 | Witco Calcium Stearate F |
| Specialty Lubricant | 1.4% | 1.5 | AmeriLubes XL623 Ester Blend in Paraffin Wax |
| Thermal Stabilizer | 0.9% | 1 | Rohm and Haas Stabilizer Tin Advastab TM-182 |
| Impact Modifier/ Processing Aid | 6.3% | 7 | Impact Modifier |

PVC Component E

| Type | Wt. % | PHR | Name |
|---|---|---|---|
| Resin | 88.0% | 100 | Oxy Vinyl 225G Polyvinyl Chloride Resin |
| Calcium Stearate | 1.1% | 1.2 | Witco Calcium Stearate F |
| Specialty Lubricant | 1.3% | 1.5 | AmeriLubes XL623 Ester Blend in Paraffin Wax |
| Thermal Stabilizer | 0.9% | 1 | Rohm and Haas Stabilizer Tin Advastab TM-182 |
| Impact Modifier/ Processing Aid | 8.8% | 10 | Impact Modifier |

PVC Component F

| Type | Wt. % | PHR | Name |
|---|---|---|---|
| Resin | 84.2% | 100 | Oxy Vinyl 225G Polyvinyl Chloride Resin |
| Calcium Stearate | 1.0% | 1.2 | Witco Calcium Stearate F |
| Specialty Lubricant | 1.3% | 1.5 | AmeriLubes XL623 Ester Blend in Paraffin Wax |
| Thermal Stabilizer | 0.8% | 1 | Rohm and Haas Stabilizer Tin Advastab TM-182 |
| Impact Modifier/ Processing Aid | 12.6% | 15 | Impact Modifier |

Blending of PVC Components

A twin screw compounding mixing extruder was utilized to blend PVC component formulations exceeding 0 phr impact modifier content (components B through G). In specific, impact modifier and non-modified PVC blend (see PVC component A for non-modified) were fed into a compounding mixing extruder using gravimetric metering feeders. The twin screw compounding mixing extruder was run at 300 rpm and heated approximately to 75-125 degrees Celsius. The modifier and PVC blend were mixed throughout the entire apparatus reaching a final powder temperature of approximately 82-104 degrees Celsius.

Compounding of Materials Used to Extrude Samples

Unless otherwise stated below, the materials used to form the test compositions were first compounded using a compounding apparatus similar to as shown in FIG. 4. In specific, particles (if used), fibers and polymer resin were fed into a compounding extruder using gravimetric metering feeders. The compounding extruder was run at 300 rpm and be heated to approximately 140-190 degrees Celsius. The particles (if used), fibers and polymer resin were heated to approximately 140-180 degrees Celsius as they passed through the melting section, mixed as they passed through the mixing section, and then water vapor and other off gases were allowed to escape through a venting section at approximately 160-180 degrees Celsius.

The composite was further compounded at a pumping section at approximately 170-190 degrees Celsius. The composite was fed into a pelletizing die producing small pellets of composite.

Extrusion of Samples

The test substrates were extruded using a rectangular die profile (1" by 0.90") (2.54 cm by 2.286 cm) at a line speed of approximately 1-3 feet (30-91 cm) per minute using a ¾ inch (1.905 cm) single screw extrusion apparatus. Zones of the extruder were heated to approximately 170-210 Celsius with material being fed with a gravimetric feeder into the first zone. The formed strips with a rectangular cross-section were then passed onto a conveyer belt to match the extruder output. The strips were then cut with a shear as needed.

Example 1

Comparison of Average Depression Depth on Surface of Extrudates

Test compositions were created by combining various amounts of resin, fibers, impact modifier, and other components. The components used are listed in Table 1 above. The formulations are listed in Table 3 below.

TABLE 2

| PVC Component | PVC Component Blend Wt. % | Wood Sawdust Particles Wt. % | Glass Fiber Wt. % | Impact Modifier Type | PHR Impact Modifier |
|---|---|---|---|---|---|
| PVC Component A | 70 | 30 | 0 | None | 0 |
| PVC Component A | 70 | 15 | 15 | None | 0 |
| PVC Component A | 70 | 0 | 30 | None | 0 |
| PVC Component E | 70 | 30 | 0 | Clearstrength 223 | 10 |
| PVC Component E | 70 | 15 | 15 | Clearstrength 223 | 10 |
| PVC Component E | 70 | 0 | 30 | Clearstrength 223 | 10 |
| PVC Component E | 70 | 30 | 0 | Durastrength 527 | 10 |
| PVC Component E | 70 | 15 | 15 | Durastrength 527 | 10 |
| PVC Component E | 70 | 0 | 30 | Durastrength 527 | 10 |
| PVC Component E | 70 | 30 | 0 | KM-X100 | 10 |
| PVC Component E | 70 | 15 | 15 | KM-X100 | 10 |
| PVC Component E | 70 | 0 | 30 | KM-X100 | 10 |

Specimens (extruded as described above) were prepared by cutting approximately 12" long strips from the length of the formed extrudate. The uncalibrated surface of the extruded sample was identified as the surface intended for depression measurement. Depression measurement was then carried out according to the procedure described above.

Figure 11:
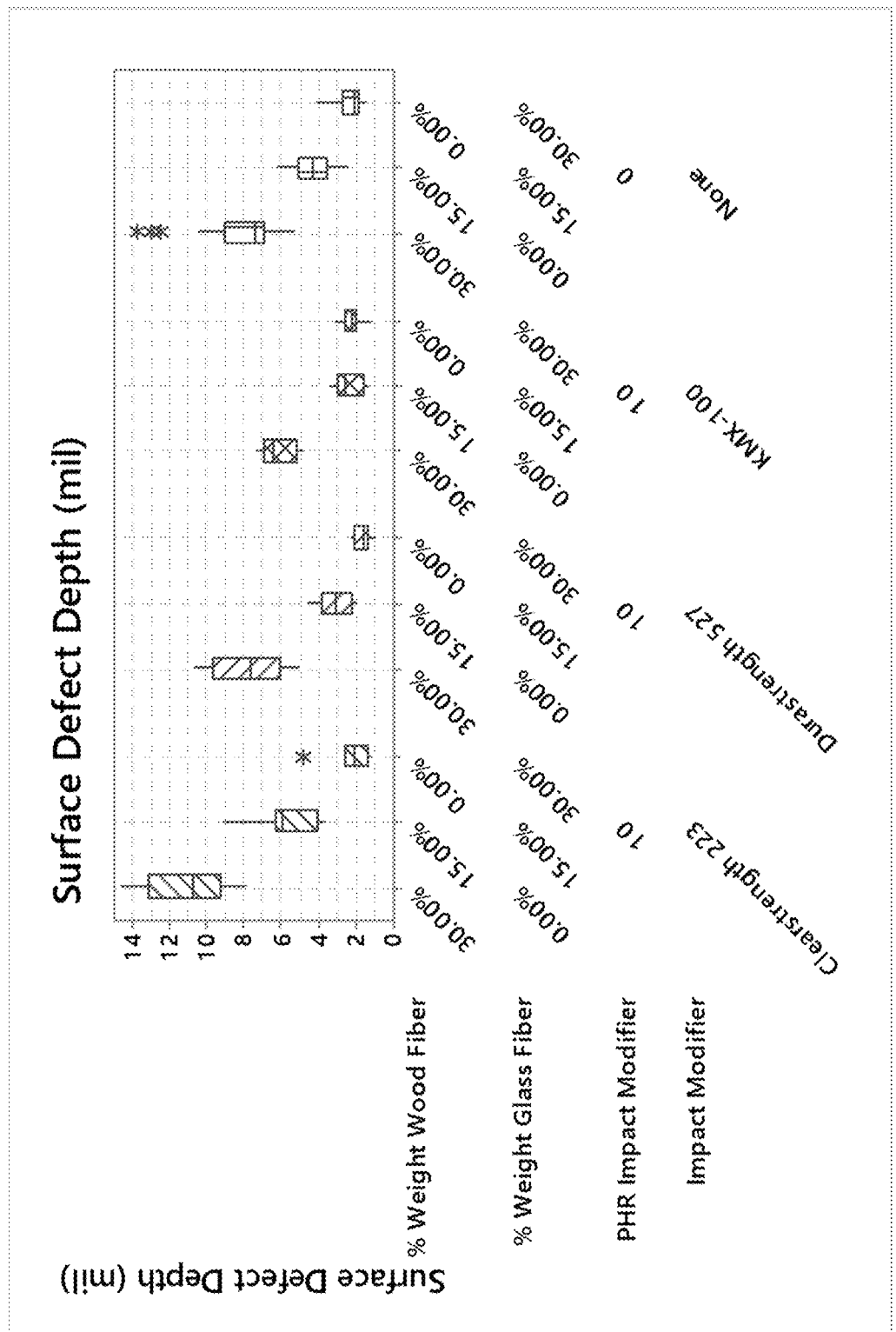
FIG. 11 is a chart of surface depression measurements for various composites.
Figure 12:
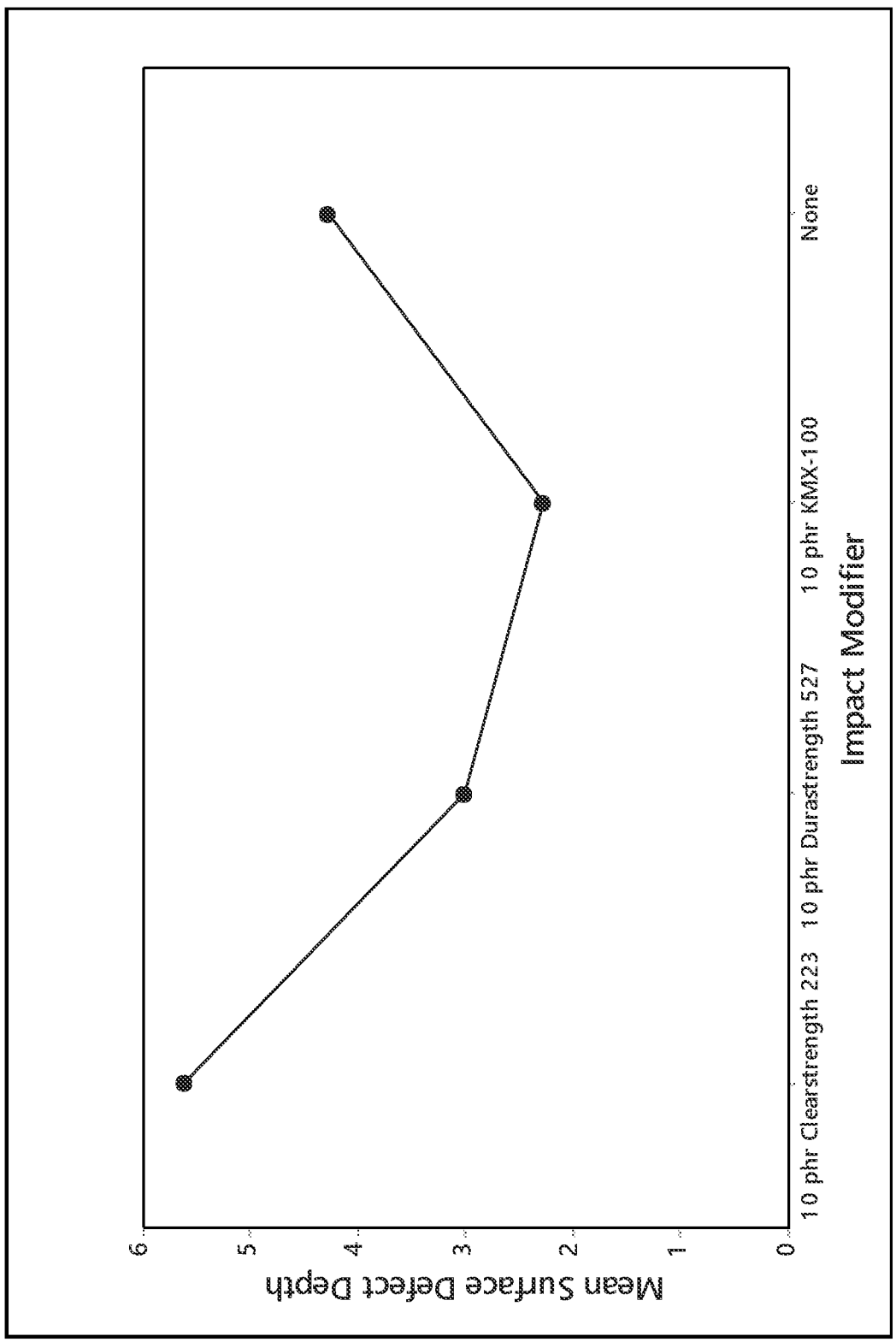
FIG. 12 is a plot showing mean surface defect depth for various composites as a function of the type of impact modifier used.

The data are shown in FIGS. 11-12. The right side of the chart shows surface depression depth measurements for compositions with no impact modifier (0 phr) The left side of the chart shows surface defect depth measurements for compositions with impact modifier (10 phr impact modifier in vinyl component). For formulations containing both wood fiber and glass fiber it can be seen that the glass filler percent content of the composite formulation along with the presence of impact modifier of a certain type (Durastrength 527 and KM-X100) improves the surface finish of the extruded lineal as measured by reduction in surface defect depth.

Figure 13:
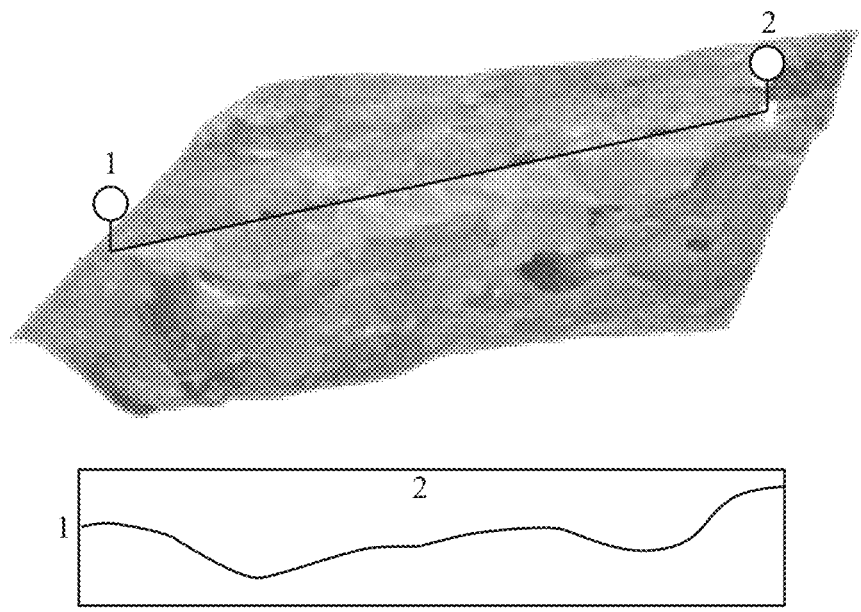
FIG. 13 is an image of the surface of a composite showing surface depressions.
Figure 14:
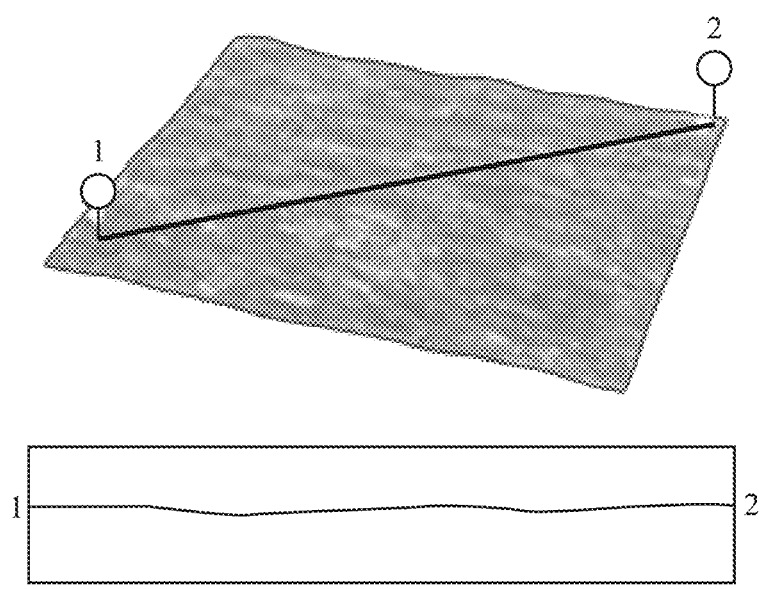
FIG. 14 is an image of the surface of a composite showing surface depressions.

The images in FIGS. 13 and 14 show extruded composite substrate surface depression measurements as measured with a Keyence VHX 2000 digital microscope (at 200× magnification). These images show the reduced surface depression depth associated with embodiments herein (FIG. 14) compared with similar compositions lacking the inclusion of impact modifiers and fibers and therefore have larger surface depression depths (FIG. 13).

Example 2

Effect of Varying Impact Modifier Amounts on Impact Strength for Various Extrusion Compositions Test compositions were created by combining various amounts of resin, fibers, impact modifier, and other components. The components used are listed in Table 1 above. The formulations are listed in Table 3 below.

TABLE 3

| PVC Component | PVC Component Blend Wt. % | Wood Sawdust Particles Wt. % | Fiber Wt. % | Impact Modifier Type | PHR Impact Modifier |
|---|---|---|---|---|---|
| PVC Component A | 80 | 5 | 15 | None | 0 |
| PVC Component C | 80 | 5 | 15 | Clearstrength 223 | 5 |
| PVC Component E | 80 | 5 | 15 | Clearstrength 223 | 10 |
| PVC Component F | 80 | 5 | 15 | Clearstrength 223 | 15 |
| PVC Component C | 80 | 5 | 15 | Durastrength 527 | 5 |
| PVC Component E | 80 | 5 | 15 | Durastrength 527 | 10 |
| PVC Component F | 80 | 5 | 15 | Durastrength 527 | 15 |
| PVC Component B | 80 | 5 | 15 | KM-X100 | 3 |
| PVC Component D | 80 | 5 | 15 | KM-X100 | 7 |
| PVC Component E | 80 | 5 | 15 | KM-X100 | 10 |
| PVC Component F | 80 | 5 | 15 | KM-X100 | 15 |

Specimens were prepared by cutting approximately four foot long strips from the length of the formed extrudate. Gardner impact resistance was then determined according to the procedure outlined above.

Figure 15:
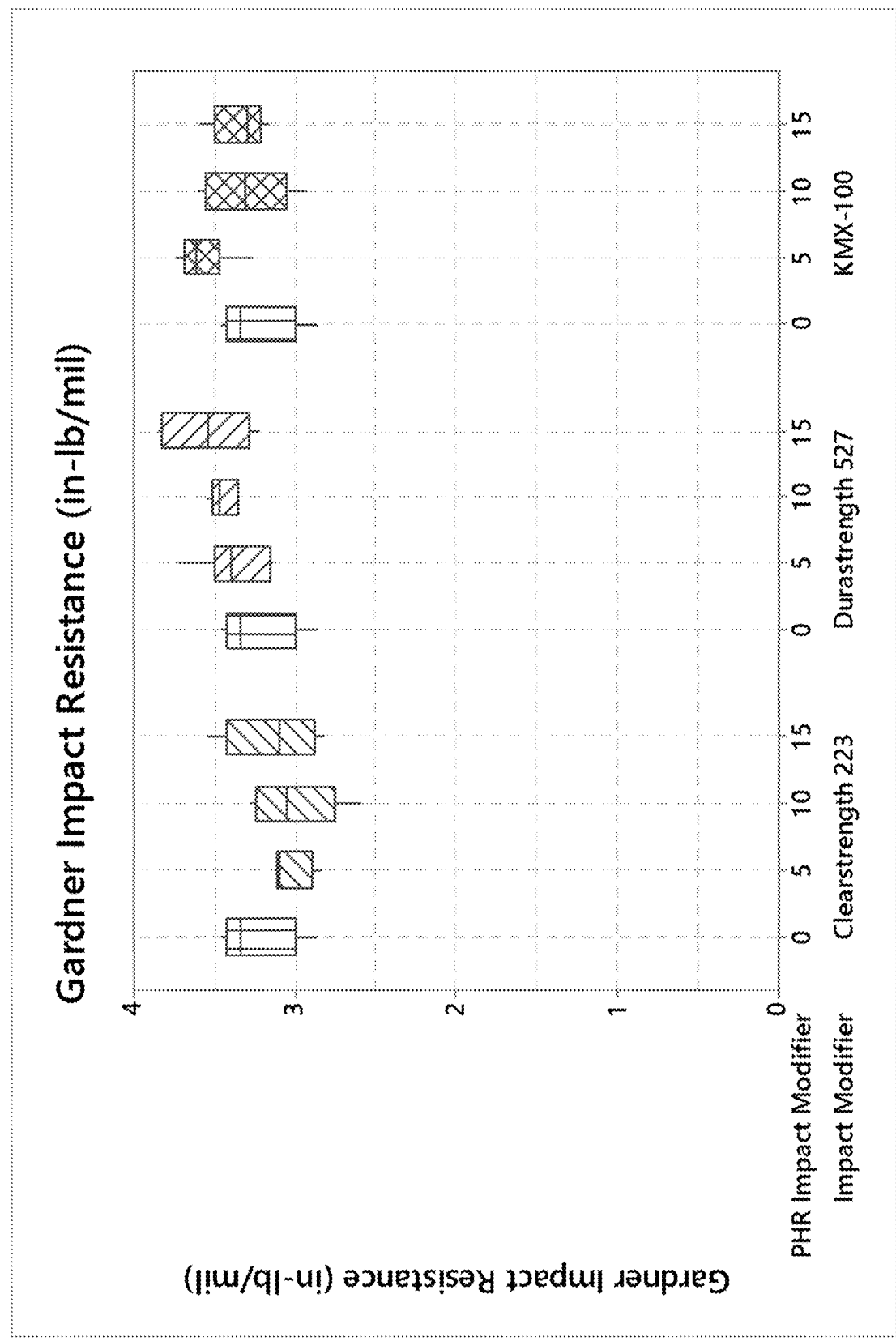
FIG. 15 is a chart showing Gardner impact resistance of a neat PVC extrusion including various levels of impact modifier, but no fibers or particles.

Data for the PVC control compositions are shown in FIG. 15. The data show that for a composition including PVC but no particles or fibers, impact resistance was not enhanced at levels of impact modifier above 5 phr.

Figure 16:
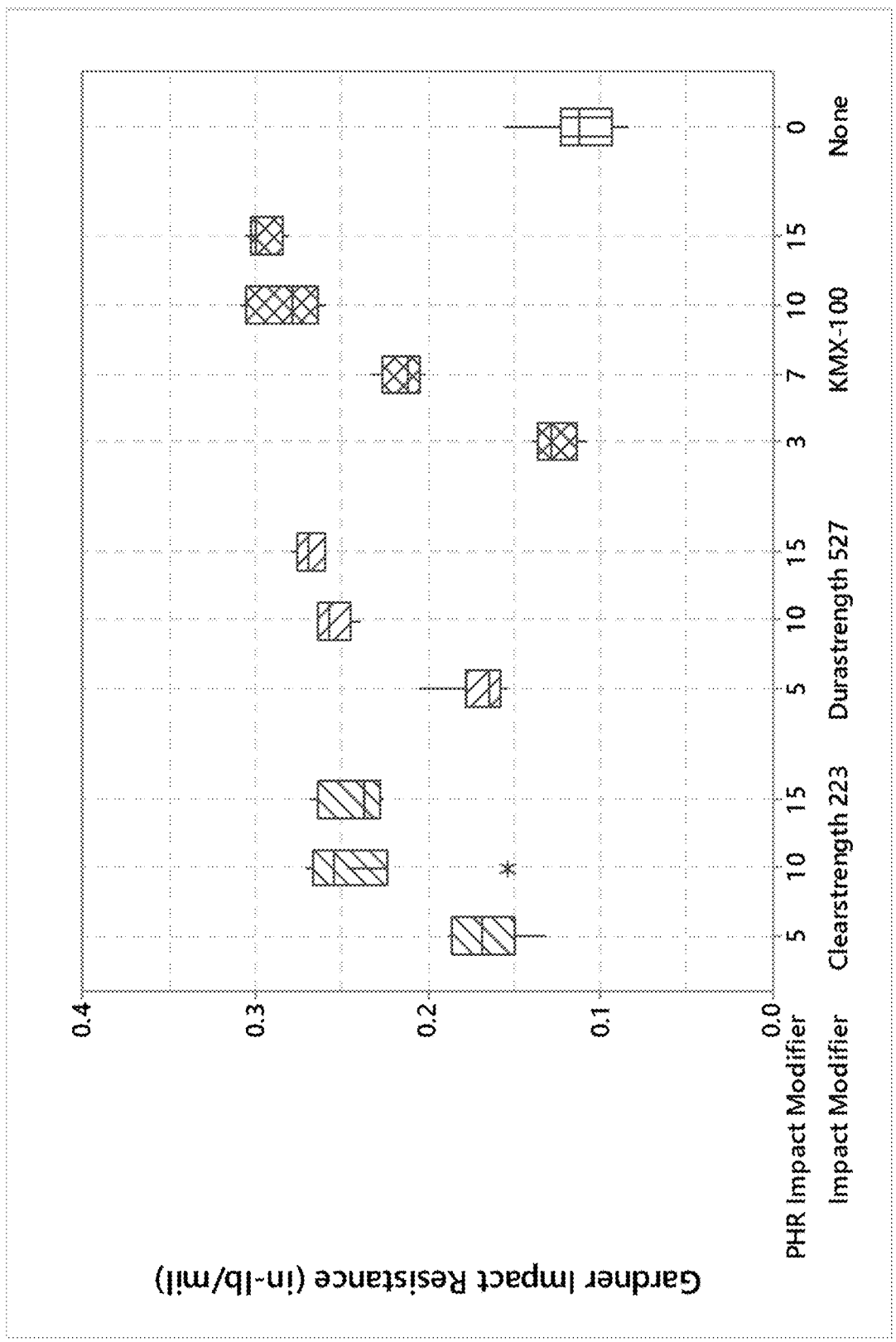
FIG. 16 is a chart showing Gardner impact resistance of composite extrusions including various levels of impact modifier along with fibers and particles.

Further data showing results for compositions including particles and fibers as described herein are shown in FIG. 16, which shows that impact resistance was enhanced by including levels of impact modifiers above 5 phr. In fact, the data even surprisingly show improved impact resistance at level of impact modifiers above 10 phr.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. An extruded article comprising:
a coextrudate comprising
a first extruded segment comprising
a polymer resin;
at least 5 phr of an impact modifier; and
at least 5 wt. % fibers;
a second extruded segment comprising
the polymer resin of the first extruded segment; and
less than 5 phr of an impact modifier;
the coextrudate defining an internal hollow;
wherein at least a portion of the second extruded segment is disposed between an adjacent side of the internal hollow and the first extruded segment of the extruded article in cross-section.

2. The extruded article of claim 1, the first extruded segment having a surface, the surface exhibiting an average depression depth of less than 0.0045 inches (0.1143 mm).

3. The extruded article of claim 2, the surface exhibiting an average depression depth of less than 0.002 inches (0.0508 mm).

4. The extruded article of claim 1, the first extruded segment comprising greater than 7.5 phr impact modifier.

5. The extruded article of claim 1, the first extruded segment comprising greater than 10 phr impact modifier.

6. The extruded article of claim 1, the impact modifier comprising a core-shell impact modifier.

7. The extruded article of claim 1, the impact modifier comprising an acrylic impact modifier.

8. The extruded article of claim 1, the impact modifier comprising a methyl methacrylate shell and an acrylate core.

9. The extruded article of claim 1, the fibers comprising glass fibers.

10. The extruded article of claim 1, the fibers having an average length after extrusion of about 0.2 mm to about 10 mm and an average diameter of about 2 microns to about 50 microns.

11. The extruded article of claim 1, the polymer resin of the first extruded segment comprising polyvinyl chloride.

12. The extruded article of claim 1, the article comprising a fenestration component.

13. The extruded article of claim 1, wherein the first extruded segment forms an external wall.

14. An extruded article comprising:
a coextrudate comprising
a first extruded segment comprising
a polymer resin;
an impact modifier in an amount greater than or equal to 10 phr; and
glass fibers; and
a second extruded segment comprising
a polymer resin; and
less than 5 phr of an impact modifier;
the coextrudate defining an internal hollow;
wherein at least a portion of the second extruded segment is disposed closer to the internal hollow than the first extruded segment of the extruded article in cross-section.

15. The extruded article of claim 14, the first extruded segment having a surface, the surface exhibiting an average depression depth of less than 0.0045 inches (0.1143 mm).

16. An extruded article comprising:
a coextrudate comprising
a first extruded segment comprising
a polymer resin;
at least 5 phr of an impact modifier; and
at least 5 wt. % fibers;
a second extruded segment comprising
the polymer resin of the first extruded segment; and
less than 5 phr of an impact modifier;
the extruded article having an outer perimeter in cross-section;
wherein at least a portion of the first extruded segment overlaps at least a portion of the second extruded segment of the extruded article in cross-section such that the portion of the second extruded segment is farther away from the outer perimeter than the portion of the first extruded segment.

* * * * *